US008207627B2

(12) United States Patent
Aldag et al.

(10) Patent No.: US 8,207,627 B2
(45) Date of Patent: Jun. 26, 2012

(54) ADAPTIVE POWER STRIP

(75) Inventors: Philip R. Aldag, Columbus, OH (US); Kevin R. Ferguson, Dublin, OH (US); Michael Wassermann, Karrebæksminde (DK)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 13/158,679

(22) Filed: Jun. 13, 2011

(65) Prior Publication Data

US 2011/0237097 A1 Sep. 29, 2011

Related U.S. Application Data

(62) Division of application No. 12/406,311, filed on Mar. 18, 2009, now Pat. No. 7,982,335.

(60) Provisional application No. 61/069,975, filed on Mar. 19, 2008, provisional application No. 61/125,189, filed on Apr. 23, 2008.

(51) Int. Cl.
*H02J 3/00* (2006.01)
*H01R 4/00* (2006.01)

(52) U.S. Cl. .......................................... 307/12; 439/208

(58) Field of Classification Search .................... 307/12; 439/208

See application file for complete search history.

(56) References Cited

U.S. PATENT DOCUMENTS 5,096,434 A * 3/1992 Byrne .......................... 439/215

(Continued)

FOREIGN PATENT DOCUMENTS

DE 29802689 9/1998

(Continued)

OTHER PUBLICATIONS

International Preliminary Report on Patentability for PCT/EP2007/008937.

(Continued)

*Primary Examiner* — Adi Amrany

(74) *Attorney, Agent, or Firm* — Harness, Dickey & Pierce, P.L.C.

(57) ABSTRACT

An adaptive power strip has a power rail. A power entry module and one or more receptacle modules having plug receptacles are mounted on the power rail. The power entry module has a power inlet to which a source of power can be coupled. The power entry module distributes power from the power source to the power rail. The receptacle modules distribute power from the power rail to the respective plug receptacles. In an aspect, the power entry module has a communications module that discovers receptacle modules on the power rail having data communications capability and if a receptacle module does not have a unique identifier assigned to it, assigns a unique identifier to the receptacle module that the receptacle module stores in a memory. The communications modules also retrieves from each receptacle module having data communications capability, information about the characteristics of the receptacle module that the communications module stores in a memory. The communications module maintains an inventory in memory of the receptacle modules on the power rail that includes information about the characteristics of the receptacle modules. In an aspect, receptacle modules determine their locations on the power rail and send information to the communications module that the communications module uses to determine the location of the receptacle modules on the power rail. In an aspect, the power entry module determines the type of power service provided to it at its power inlet.

5 Claims, 16 Drawing Sheets

U.S. PATENT DOCUMENTS

| | | | |
|---|---|---|---|
| 5,157,273 A | 10/1992 | Medendorp et al. | |
| 5,164,609 A | 11/1992 | Poppe et al. | |
| 5,198,806 A * | 3/1993 | Lord | 726/36 |
| 5,203,713 A | 4/1993 | French et al. | |
| 5,270,576 A | 12/1993 | Kahle | |
| 5,424,903 A | 6/1995 | Schreiber | |
| 5,506,573 A | 4/1996 | Ewing et al. | |
| 5,582,522 A * | 12/1996 | Johnson | 439/214 |
| 5,788,517 A | 8/1998 | Elmouchi | |
| 5,788,521 A * | 8/1998 | Milan | 439/214 |
| 5,949,974 A | 9/1999 | Ewing et al. | |
| 6,424,547 B2 * | 7/2002 | Murabayashi et al. | 363/69 |
| 6,442,017 B1 | 8/2002 | Ewing et al. | |
| 6,443,746 B1 * | 9/2002 | Yu | 439/107 |
| 6,445,087 B1 * | 9/2002 | Wang et al. | 307/40 |
| 6,476,729 B1 | 11/2002 | Liu | |
| 6,573,617 B2 * | 6/2003 | Jones et al. | 307/36 |
| 6,663,435 B2 * | 12/2003 | Lincoln et al. | 439/652 |
| 6,711,613 B1 | 3/2004 | Ewing et al. | |
| 6,741,442 B1 | 5/2004 | McNally et al. | |
| 6,937,461 B1 | 8/2005 | Donahue, IV | |
| 7,010,589 B2 | 3/2006 | Ewing et al. | |
| 7,043,543 B2 | 5/2006 | Ewing et al. | |
| 7,099,934 B1 | 8/2006 | Ewing et al. | |
| 7,116,550 B2 | 10/2006 | Ewing et al. | |
| 7,137,850 B2 | 11/2006 | Ewing et al. | |
| 7,141,891 B2 | 11/2006 | McNally et al. | |
| 7,162,521 B2 | 1/2007 | Ewing et al. | |
| 7,171,461 B2 * | 1/2007 | Ewing et al. | 709/223 |
| 7,196,900 B2 | 3/2007 | Ewing et al. | |
| 7,215,535 B2 | 5/2007 | Pereira | |
| 7,252,524 B1 * | 8/2007 | Johnson et al. | 439/210 |
| 7,268,998 B2 | 9/2007 | Ewing et al. | |
| 7,275,947 B2 | 10/2007 | Hartel et al. | |
| 7,312,980 B2 | 12/2007 | Ewing et al. | |
| 7,324,006 B2 | 1/2008 | Godard | |
| 7,368,830 B2 | 5/2008 | Cleveland et al. | |
| 7,400,493 B2 | 7/2008 | Ewing et al. | |
| 7,438,566 B2 * | 10/2008 | Chen | 439/110 |
| 7,446,538 B2 | 11/2008 | Kuo | |
| 7,456,588 B2 | 11/2008 | Alexandrov | |
| 7,544,077 B1 * | 6/2009 | Martin et al. | 439/215 |
| 7,567,430 B2 | 7/2009 | Ewing et al. | |
| 7,598,720 B2 | 10/2009 | Veroni et al. | |
| 7,635,271 B2 * | 12/2009 | Leslie et al. | 439/121 |
| 7,777,365 B2 | 8/2010 | Cleveland | |
| 7,812,479 B1 * | 10/2010 | Menas | 307/31 |
| 7,816,903 B2 | 10/2010 | Goto | |
| 7,841,878 B2 * | 11/2010 | Johnson et al. | 439/215 |
| 7,891,993 B2 | 2/2011 | Huber et al. | |
| 2001/0027066 A1 * | 10/2001 | Loh | 439/701 |
| 2002/0002582 A1 | 1/2002 | Ewing et al. | |
| 2005/0036258 A1 | 2/2005 | Ma et al. | |
| 2005/0070166 A1 | 3/2005 | Brandt et al. | |
| 2005/0082239 A1 | 4/2005 | Laurosch et al. | |
| 2005/0093376 A1 | 5/2005 | Cleveland | |
| 2005/0094357 A1 | 5/2005 | Ewing et al. | |
| 2005/0169015 A1 | 8/2005 | Luk et al. | |
| 2005/0203987 A1 | 9/2005 | Ewing et al. | |
| 2005/0223090 A1 | 10/2005 | Ewing et al. | |
| 2005/0259383 A1 | 11/2005 | Ewing et al. | |
| 2006/0031453 A1 | 2/2006 | Ewing et al. | |
| 2006/0031454 A1 | 2/2006 | Ewing et al. | |
| 2006/0044766 A1 | 3/2006 | Hartel et al. | |
| 2006/0063434 A1 | 3/2006 | Bergmann et al. | |
| 2006/0092600 A1 | 5/2006 | Ewing et al. | |
| 2006/0139855 A1 | 6/2006 | Ewing et al. | |
| 2006/0199438 A1 | 9/2006 | Cleveland | |
| 2006/0259538 A1 | 11/2006 | Ewing et al. | |
| 2007/0006603 A1 | 1/2007 | Reusche et al. | |
| 2007/0016664 A1 | 1/2007 | Ewing et al. | |
| 2007/0050443 A1 | 3/2007 | Ewing et al. | |
| 2007/0076340 A1 | 4/2007 | Ewing et al. | |
| 2007/0123075 A1 | 5/2007 | Insalaco et al. | |
| 2007/0128927 A1 | 6/2007 | Cleveland | |
| 2007/0130243 A1 | 6/2007 | Ewing et al. | |
| 2007/0136453 A1 | 6/2007 | Ewing et al. | |
| 2007/0140238 A1 | 6/2007 | Ewing et al. | |
| 2007/0168088 A1 | 7/2007 | Ewing et al. | |
| 2007/0184721 A1 | 8/2007 | Ewing et al. | |
| 2007/0273215 A1 * | 11/2007 | Menas et al. | 307/80 |
| 2007/0276548 A1 | 11/2007 | Uzunovic et al. | |
| 2007/0291430 A1 | 12/2007 | Spitaels et al. | |
| 2008/0093927 A1 | 4/2008 | Ewing et al. | |
| 2008/0094210 A1 | 4/2008 | Paradiso et al. | |
| 2008/0136607 A1 | 6/2008 | Ratcliff et al. | |
| 2008/0140813 A1 | 6/2008 | Ratcliff et al. | |
| 2008/0148075 A1 | 6/2008 | Reder | |
| 2008/0238404 A1 | 10/2008 | Ferguson | |

FOREIGN PATENT DOCUMENTS

| | | | |
|---|---|---|---|
| DE | 102005040859 | A1 | 7/2006 |
| DE | 202006015827 | U1 | 12/2006 |
| EP | 1521511 | A2 | 4/2005 |
| EP | 1600045 | A1 | 11/2005 |
| WO | WO-8701524 | A1 | 3/1987 |
| WO | WO-9310615 | A1 | 5/1993 |
| WO | WO-2004077907 | A1 | 9/2004 |
| WO | WO-2007064118 | A1 | 6/2007 |
| WO | WO-2007082071 | A2 | 7/2007 |
| WO | WO-2008036848 | A2 | 3/2008 |
| WO | WO-2008046577 | A1 | 4/2008 |

OTHER PUBLICATIONS

Liebert MP Advanced Power Strips; Managed Power Strips Provide Easy-To-Use Distribution, Monitoring and Control for IT Rack/Enclosure Applications; © 2006.

International Search Report and Written Opinion of the International Searching Authority PCT/US2009/037534, Dec. 30, 2009.

Knurr DI-STRIP Product Literature.

* cited by examiner

| POLES/N | BACKGROUND COLOR ( 2702 ) |
|---|---|
| L1 - L3 | RED |
| L2 - L3 | GREEN |
| L1 - L2 | BLUE |
| L1 - N | AQUAMARINE |
| L2 - N | PURPLE |
| L3 - N | YELLOW |

ADAPTIVE POWER STRIP

CROSS-REFERENCE TO RELATED APPLICATIONS

This application is a divisional of U.S. patent application Ser. No. 12/406,311 filed on Mar. 18, 2009 which claims the benefit of U.S. Provisional Application No. 61/125,189 filed Apr. 23, 2008 entitled "Adaptive Power Strip" and of U.S. Provisional Application No. 61/069,975 filed Mar. 19, 2008 entitled "Adaptive Power Strip." The entire disclosures of each of the above applications are incorporated herein by reference.

FIELD

The present disclosure relates to power strips.

BACKGROUND

The statements in this section merely provide background information related to the present disclosure and may not constitute prior art.

Power strips are used to provide power to electrical devices. They typically include a housing having a plurality of receptacles coupled to a power bus. The power bus is connected to a source of power, such as by a cord.

One application for power strips is in rack mounted enclosures in which cord connected electronic devices are mounted. The electronic devices may include, by way of example and not of limitation, telecommunications devices, servers, and other types of rack mounted electronic devices.

SUMMARY

This section provides a general summary of the disclosure, and is not a comprehensive disclosure of its full scope or all of its features.

In accordance with an aspect of the present disclosure, a power strip has a power rail having a power bus capable of distributing up to three phase AC power and a communications bus. The power bus includes a plurality of power bus conductors and the communications bus includes a plurality of communications bus conductors. The conductors are recessed in a longitudinally extending chassis of the power rail and run through the chassis along the length of the chassis. The power bus includes a hot conductor for each of the three phases (L1, L2, L3), a neutral conductor and a ground conductor. The power rail has a power entry module mounted on it. In an aspect, the power entry module has a power inlet to which a source of power can be coupled, such as via a cordset having a plug that is received in the power inlet. Alternatively, in an aspect, the cordset is hardwired to the power entry module without a power inlet. The power entry module also includes a plurality of power entry module power bus terminals that mate with the power bus conductors of the power rail and a plurality of power entry module communications bus terminals that mate with the communications bus conductors of the power rail. The power rail can have a plurality of receptacle modules mounted on it. Each receptacle module includes a plurality of receptacle module power terminals that mate with the power bus conductors of the power rail and a plurality of plug receptacles. Each receptacle module distributes AC power from the power rail to the receptacle module's plug receptacles. The receptacle modules are selectable from receptacle modules having a plurality of different power configurations and characteristics.

In an aspect, the power entry module includes a communications module that conducts a discovery process when a receptacle module having data communication capability is mounted on the power rail. The communication module queries that receptacle module via the communications bus to determine whether that receptacle module had a unique identifier assigned to it and if not, assigns a unique identifier to that receptacle module that the communications module sends to the receptacle module via the communications bus and that the receptacle module stores in a memory. The communications module via the communications bus retrieves from that receptacle module information indicative of the characteristics of that receptacle module and a location of that receptacle module on the power rail that the communications module stores in a memory. The communications module maintains in memory an inventory of each receptacle module mounted on the power rail to which the communication module assigned a unique identifier that includes the information indicative of the characteristics of each such receptacle module and its location on the power rail.

In an aspect, the communication module makes the information in its inventory of receptacle modules accessible to a display module coupled to the communications module. In an aspect, the communications module makes the information in its inventory of receptacle modules accessible to a remote system to which the communications module is coupled via a network. In an aspect, the network is the Internet.

In an aspect, the display module has selectable views for displaying information about power utilization of the power strip, each receptacle module having monitoring capability that is mounted on the power rail of the power strip and each plug receptacle of each such receptacle module that also has plug receptacle monitoring capability.

In an aspect, each receptacle module having data communications capability has a display that displays alpha-numeric information and each receptacle module assigned a unique identifier displaying on its display its assigned unique identifier. In an aspect, the display includes a portion that indicates whether a receptacle module having been assigned a unique identifier has been discovered by the communications module. In an aspect, the display is a seven segment LED display having a decimal point and the decimal point is the portion that indicates whether the receptacle module has been discovered by the communications module. The receptacle module illuminates the decimal point of the display to indicate that the receptacle module has not been discovered by the communications module. In an aspect, a receptacle module mounted on the power rail that has not been assigned a unique identifier flashes the segments of the 7-segment LED display in a sequence.

In an aspect, the power inlet of the power entry module has a hot terminal for each of the three phases (L1, L2, L3), a neutral terminal and a ground terminal. The power entry module includes a monitor/control circuit that based on the presence or absence of a voltage on the neutral terminal of the power inlet and based on voltage differences between at least two of the phases at the hot terminals of the power inlet, determines a type of power service provided to the power inlet and based thereon sets the power service that the power entry module is distributing to the power bus of the power rail.

In an aspect, if difference between an L1 voltage and an L2 voltage is not greater than 120 volts, the monitor/control circuit determines the power service is 1-pole, 3-wire; if the difference between the L1 voltage and L2 voltage is greater than 120 volts and a difference between an L3 voltage and the L1 voltage is not greater than 120 volts, the monitor/control circuit determines the power service is 2-pole, 3-wire; if the differences between the L1 and L2 voltages and the L3 and L1 voltages are both greater than 120 volts and a neutral voltage is not present, the monitor/control circuit determines the power service is 3-pole, 4-wire; and if the differences between the L1 and L2 voltages and the L3 and L1 voltages are both greater than 120 volts and a neutral voltage is present, the monitor/control circuit determines the power service is 3-pole, 5-wire.

In an aspect, the power rail has a resistive element that runs through the chassis along the length of the chassis and the power entry module has a power entry module DC power supply and provides a DC voltage to the resistive element through a terminal that mates with the resistive element. In this aspect, the receptacle modules are selectable from receptacle modules that include a voltage sensing circuit coupled through a terminal that mates to the resistive element at a point spaced from a point where the power entry module provides the DC voltage to the resistive element. Those receptacle modules include a monitor/control circuit that generates information indicative of a position of the receptacle module on the power rail based on a DC voltage of the resistive element sensed by the voltage sensing circuit. In an aspect, the resistance of the resistive element continuously increases along the length of the resistive element starting at an end closest to the power entry module. In an aspect, the resistive element is a carbon plated conductor. In an aspect, the resistive element includes a segmented conductor having a plurality of conductors with ends of adjacent conductors bridged by a resistor. In an aspect, the monitor/control circuit of such a receptacle module sends the information indicative of the location of the receptacle module on the power rail with respect to the power entry module via the communications bus to a communication module of the power entry module. In an aspect, the information indicative of the position of the receptacle module on the power rail is the voltage sensed by the voltage sensing circuit and digitized. This digitized voltage is proportional to the location of the receptacle module on the power rail.

In an aspect, the power entry module has a power entry module DC power supply that provides DC power to a communications module of the power entry module. The receptacle modules include receptacle modules that have a plurality of receptacle module communications bus terminals that mate with the communications bus conductors of the power rail that include data and power terminals and a receptacle module DC power supply. The receptacle module DC power supply has an output coupled to the receptacle module communications bus power terminal to provide redundant DC power to the communications bus of the power rail which is provided through the power entry module to the communications module to provide redundant DC power to the communications module. In an aspect, the power entry module provides DC power to the power rail of the communications bus.

In an aspect, the receptacle modules include receptacle modules that have a monitor/control circuit and a voltage sensing circuit coupled thereto that senses voltage on a hot output terminal of a circuit breaker of the receptacle module. The monitor/control circuit determines that the circuit breaker is open when the voltage on that hot output terminal of the circuit breaker is less than a reference voltage and energizes a display to indicate that the circuit breaker is open. In an aspect, the monitor/control circuit flashes the display when it energizes the display. In an aspect, the display is the seven segment LED display.

In an aspect, each receptacle module includes a color code that indicates a power configuration of the receptacle module. In an aspect, the receptacle modules are selectable from receptacle modules having a plurality of different power configurations. Each receptacle module has the color code that indicates its power configuration,. Each of the plurality of different power configurations have a unique color code. In an aspect, each receptacle module has a second color code indicative of the region for which it is configured. In an aspect, the color codes are included on a label.

In an aspect, the receptacle module distributes AC power to its plug receptacles through relays. In an aspect, the receptacle modules include receptacle modules having a monitor/control circuit that is responsive to remote commands sent via the communications bus to set power-up delay times for each of the relays.

In an aspect, each receptacle module distributes one of single phase AC power or polyphase AC power to its plug receptacles.

In an aspect, each receptacle module has a housing having a contact block. The contact block has a plurality of blades that mate with respective slots in the power rail in which the power bus conductors of the power rail run. Each blade includes a protective shroud between which a contact that mates with one of the power conductors of the power rail is disposed. Each contact has a lower portion having at least one pair of spring contacts and an upper portion having a terminal. In an aspect, the lower portion of each contact includes a plurality of pairs of spring contacts. In an aspect, the receptacle module has a power configuration and the contact block includes only blades for connecting to those of the power conductors of the power rails needed for the power configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION

The following description is merely exemplary in nature and is not intended to limit the present disclosure, application, or uses.

In accordance with an aspect of the present disclosure and with reference to the drawings, an adaptive power strip is described. The adaptive power strip provides power distribution, power monitoring, control and management of cord connected electronic devices. In an aspect, the adaptive power strip provides modular, scalable power distribution of various capacities to cord connected electronic devices, such as those mounted in a rack or other enclosure. In an aspect, the adaptive power strip mounts in the rack/enclosure. The adaptive power strip includes modular components, also referred to as modules herein, that allow the power distribution capability and functionality of the adaptive power strip to be configured for a particular application. The power distribution capability and functionality of a particular adaptive power strip is determined by the specific types and configuration of the modules used in that particular adaptive power strip.

In an aspect, the modules include intelligent modules having a controller, such as a microprocessor, micro-controller, an ASIC, or other type of electronic circuit that controls the module. The intelligent module can include communications and monitoring electronics for the communication and exchange of information, such as with a host, to obtain and communicate their operational status and monitored parameters and coordinate, such as with the host and other modules, responses to abnormal or disallowed operational conditions.

In an aspect, the modules include hot swappable modules so that the capability and performance of the adaptive power strip can be easily modified in the field. In an aspect, the adaptive power strip has a vertical mounting configuration. In an aspect the adaptive power strip has a horizontal mounting configuration.

Figure 1:
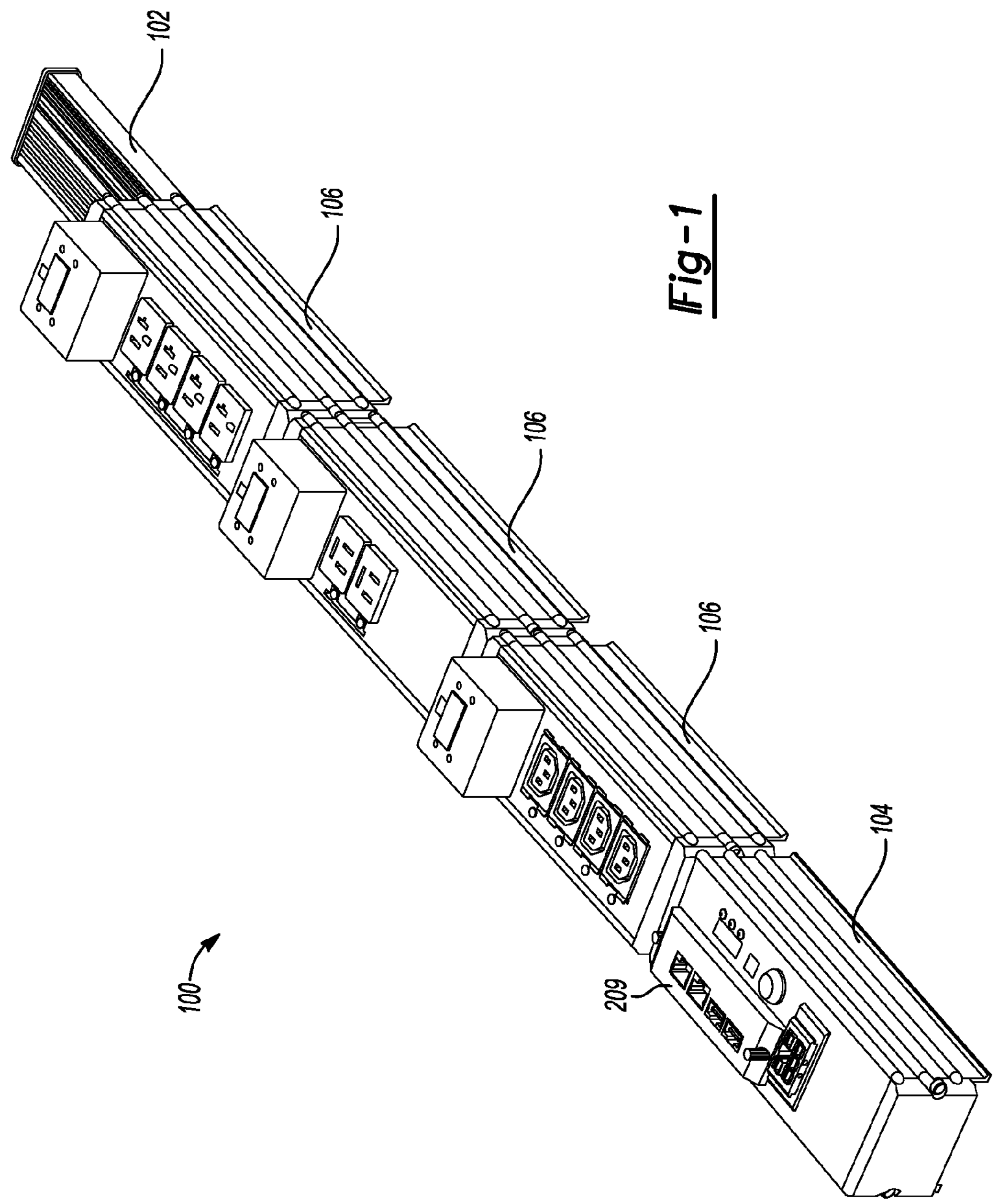
FIG. 1 is a perspective view of an adaptive power strip in accordance with an aspect of the present disclosure.

With reference to FIG. 1, in an illustrative embodiment an adaptive power strip 100 includes a power rail 102 on which a power entry module 104, and one or more receptacle modules 106 are mounted. In an aspect, a communication module 209 plugs into the power entry module 104. In an aspect, communication module 209 is configured to mount on power rail 102. In an aspect, the power rail 102 includes multiple recessed electrical conductors embedded along the length of an insulated structure. The electrical conductors provide an AC power bus to distribute single or polyphase AC power, depending on the configuration of the power rail. The electrical conductors may also include electrical conductors that provide a low voltage DC power bus to distribute low voltage DC power. The electrical conductors may also include electrical conductors that provide a communication bus. In an aspect, the modules can be mounted anywhere and in any order along the power rail to contact the busses to derive operational DC power, divert or distribute AC power, and communicate via the communication bus, such as with each other, to a host, or to other devices.

In an aspect, certain conductors of the busses are disposed at different depths along the power rail 102 to provide proper circuit sequencing for hot-plug installation of a hot swappable module.

In an aspect, the power rail form factor is low-profile and open on the sides as opposed to a hollow, recessed cavity form factor. This saves material costs and allows different size modules having the same contact footprint to be mounted to the power rail.

The AC power bus of the power rail is energized by the power entry module. In an aspect, the power entry module has a cord connection that connects to a source of AC power. In an aspect, the power entry module includes voltage and/or current protection (the protection including over and/or under protection). In an aspect, the power entry module includes power conditioning electronics.

In an aspect, the DC bus is energized by the power entry module. In an aspect, the power entry module includes an AC-DC switching power supply that provides the DC power to the communications bus.

In an aspect, the power entry module may preferably be mounted at either end of the power rail for safe configuration and/or power feed redundancy.

In an aspect, a receptacle module's AC line voltage assignment is defined by a switching setting, contact arrangement, or rotational position into the power rail.

In an aspect, the power rail is extensible. In an aspect, the power rail is extensible by electrically connecting two or more power rails end-to-end. In an aspect, the power rail is extensible by electrically connecting two or more power rails side-by-side. In an aspect, the power rails are interlocked together. In an aspect, a bridging capping module that mates to adjacent ends of the power rails to be joined provides the electrical bridging of the conductors of the busses.

In an aspect, the modules include a center screw lock or similar feature that engages through the module into a center channel or cavity running inside the power rail to provide additional securement of the module to the power rail.

In an aspect, the power rail includes a resistive element running along the power rail, such as along the center of the power rail, which the modules mounted on the power rail can utilize in determining their location on the power rail by a voltage sensing technique. In an aspect, the resistive element is a carbon plated conductor. In an aspect, this resistance element is a conductor periodically broken by slots that are bridged by a resistance, such as a surface mount resistor disposed in the slot.

In an aspect, the modules, particularly the receptacle modules, are user programmable.

In an aspect, the adaptive power strip has features, such as electrical and/or electromechanical features, so that the physical location of the adaptive power strip in a rack can be identified.

In an aspect, a communication module can be plugged into the power rail or to other of the modules, such as a receptacle module or power entry module. In an aspect, the DC bus of the power rail provides DC power to the communication module for power redundancy and greater uptime in the event of power failures or servicing.

In an aspect, a power rail bus bridging connector allows the power and communication busses to electrically "wrap" around ends of the power rail so that two power rails can be electromechanically jointed and provide "back-to-back" power distribution.

In an aspect, the receptacle modules includes visible status indicators that may also be used for receptacle identification during configuration, calibration or setup.

Power entry and receptacle module variants provide alternate connection for extension of high-density power distribution via inlet, direct or plug attachment of similar cord connected receptacle modules.

In an aspect, the modules are color coded to provide unique identification of the configuration of the modules, such as power rating and power configuration.

In an aspect, the modules include visible indicators that display the addresses of the adaptive power strip on which the module is mounted and of the module.

Figure 2:
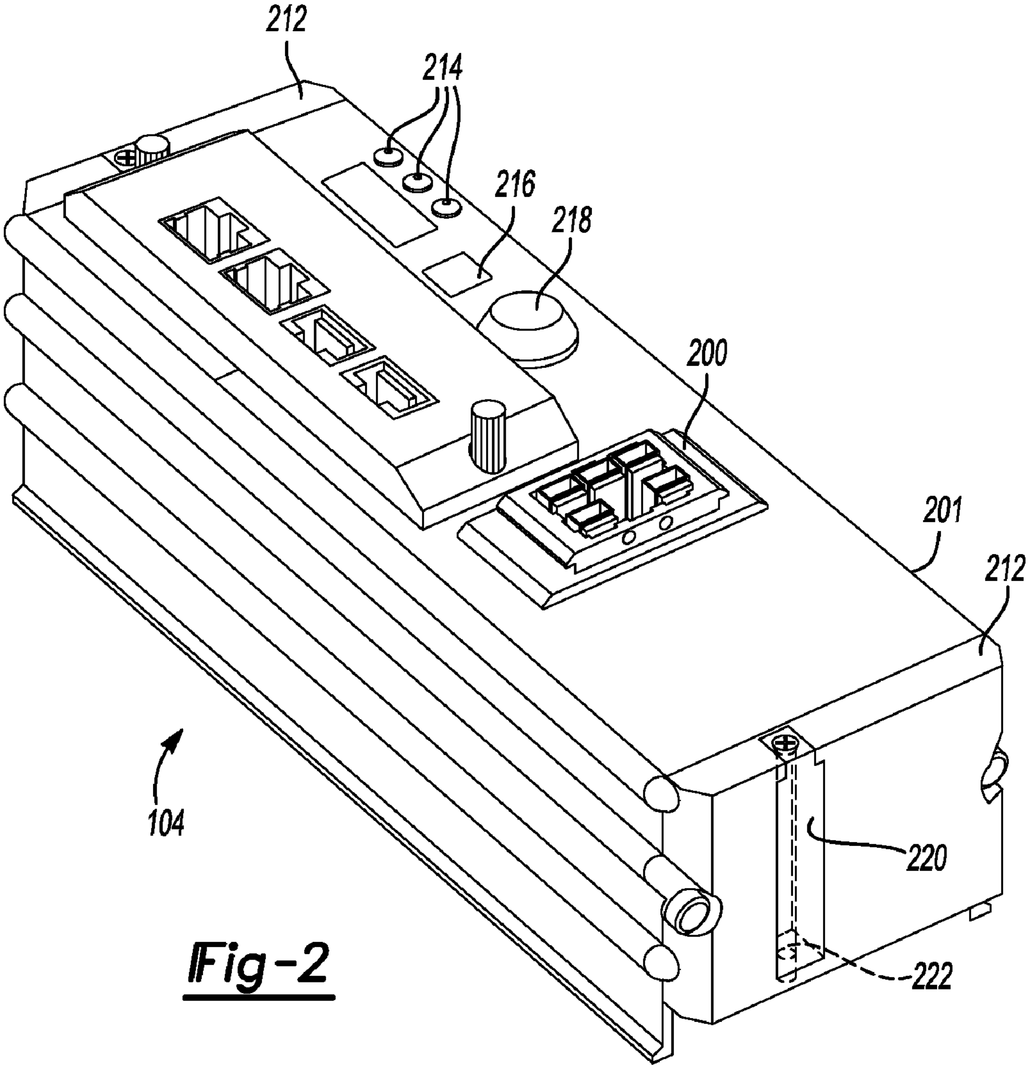
FIG. 2 is a perspective view of a power entry module for the adaptive power strip of FIG. 1.
Figure 3:
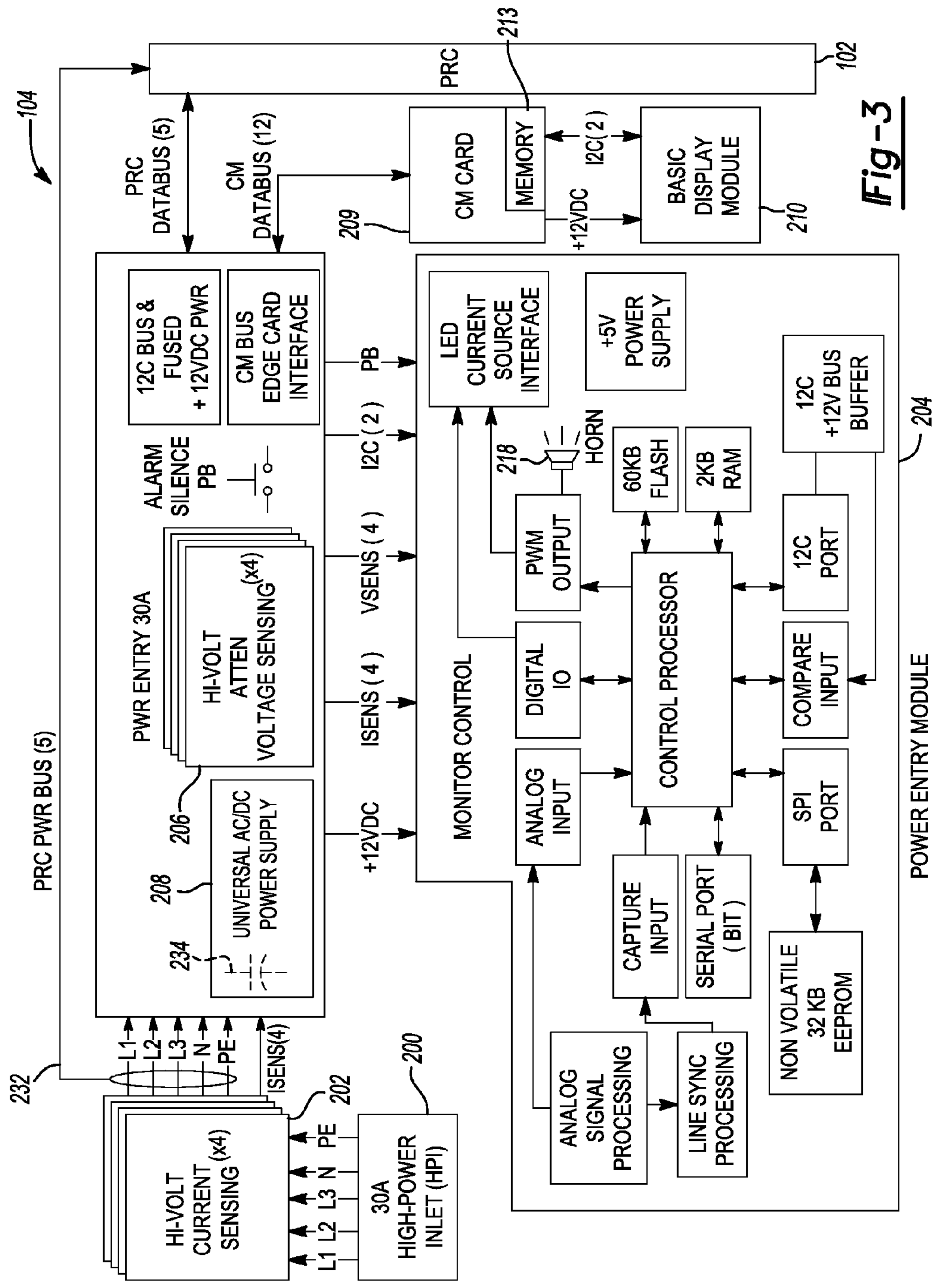
FIG. 3 is a block diagram of a circuit architecture for the power entry module of FIG. 2.

FIG. 2 shows an illustrative embodiment of a power entry module 104 and FIG. 3 is a block diagram of an illustrative circuit architecture for power entry module 104 (excluding the box labeled PRC which is power rail 102). Power entry module 104, depending on its configuration, distributes one, two or three phase AC power, such as 120/208 VAC (e.g., US) or 230 VAC (e.g., Europe), over the AC bus of the power rail 102. Power entry module 104 illustratively has a housing 201 and a high power inlet 200. The high power inlet 200 may include an appropriately sized circuit breaker. The high power inlet 200 is illustratively coupled to a source of AC power by a cord (not shown) that plugs into high power inlet 200. High power inlet 200 illustratively has power lines 232 illustratively having five output conductors—three hot conductors (L1, L2, L3) for each of the three phases, a neutral and a system ground (PE), which are coupled to the power rail to provide the AC power to the AC bus of the power rail. In aspects, the cord may be hardwired to high power inlet 200. In such aspects, high power inlet may have only the number of conductors required for the type of power that power entry module 104 is configured to distribute to power rail 102. For example, if power entry module 104 distributes 1 pole, 3 wire power (e.g., 120 VAC, single phase power), high power inlet 200 may only have three conductors—a hot conductor (L1, L2 or L3) neutral and ground. Each of the hot conductors and neutral passes through a respective current sensing circuit 202. Current sense outputs of each of the current sensing circuits are coupled to a monitor/control circuit 204. The hot conductors and neutral are also coupled to voltage sensing circuits 206. The outputs of the voltage sensing circuits are also coupled to the monitor/control circuit 204. Power entry module 104 may include visual indicators 214, such as light emitting diodes, that can be used to display the status of each of lines L1-L3, such as whether they are hot (active), over current, over voltage, or the like. Visual indicators 214 may illustratively be coupled to monitor/control circuit 204. Power entry module may also include an audible alarm 216 and an alarm reset button 218, both of which may illustratively be coupled to monitor/control circuit 204.

The power entry module 104 includes a universal AC/DC power supply 208 that provides the DC power for the power entry module 104. In an aspect, AC/DC power supply 208 provides DC power to the power rail of the communications bus of the power rail 102. The power entry module 104 also illustratively includes a slot for a communications module card 209, such as an Ethernet card, that provides a data bus, such as an $I^2C$ bus, that is coupled to the data bus of the power rail 102. In an aspect, AC/DC power supply 208 provides DC power to communications module 209. A display module 210 may be coupled to the communications module card 209.

In an aspect, the power entry module 104 is a configurable poly-phase 32 amp version with a high-power inlet. In an aspect, the power entry module is configured by the type of power provided by the cordset that plugs into the power entry module, as described in more detail below. In an aspect, the power entry module is a 3-phase 60 amp version with a non-detachable power supply cord.

In an aspect, the monitor/control circuit 204 of the power entry module 104 monitors the aggregate power consumed by the power rail 102. In an aspect the monitor/control circuit communicates this data to other devices, such as a host, via the communication bus and the communication module card 209.

Figure 4:
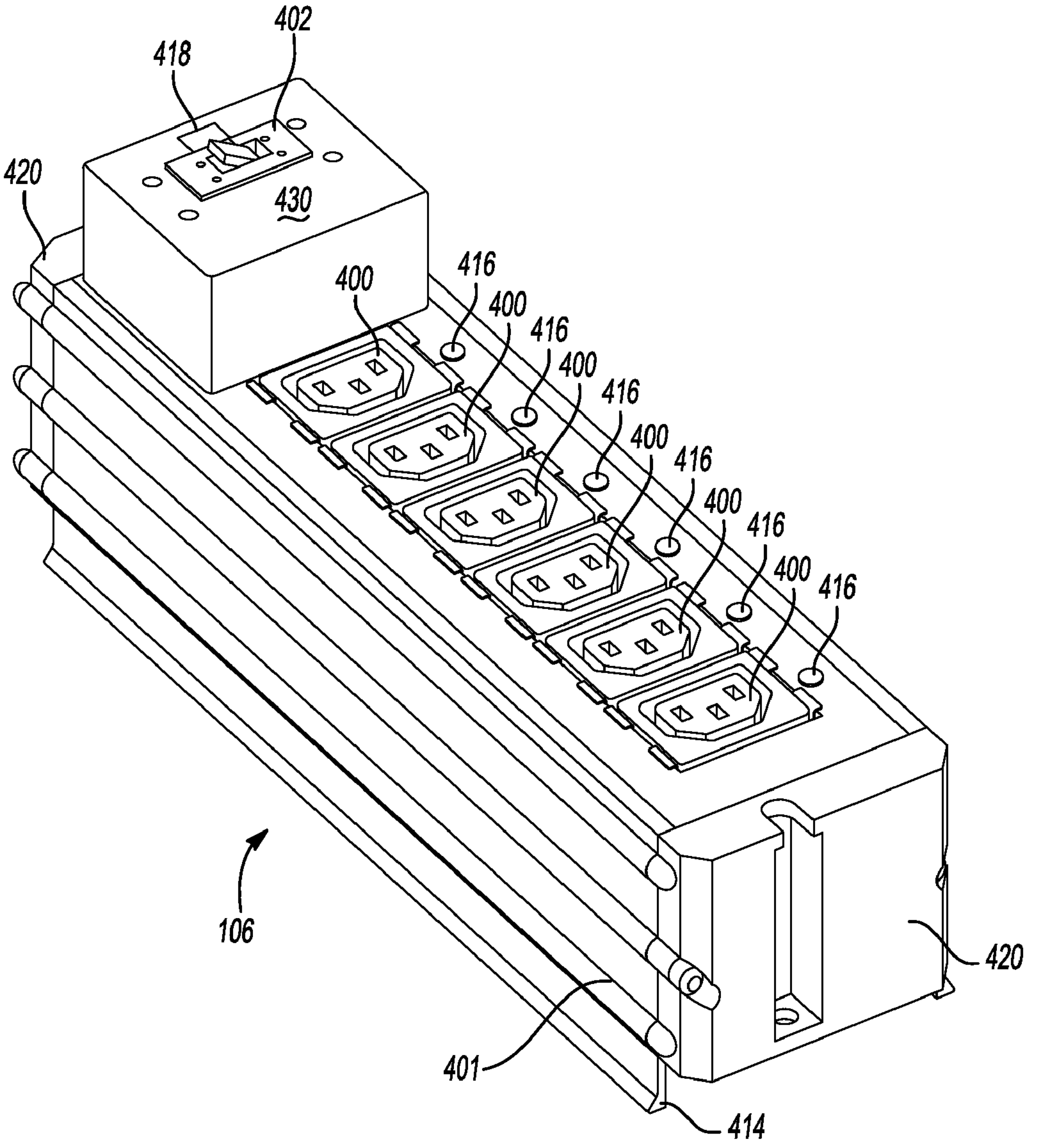
FIG. 4 is a perspective view of a receptacle module for the adaptive power strip of FIG. 1.
Figure 5:
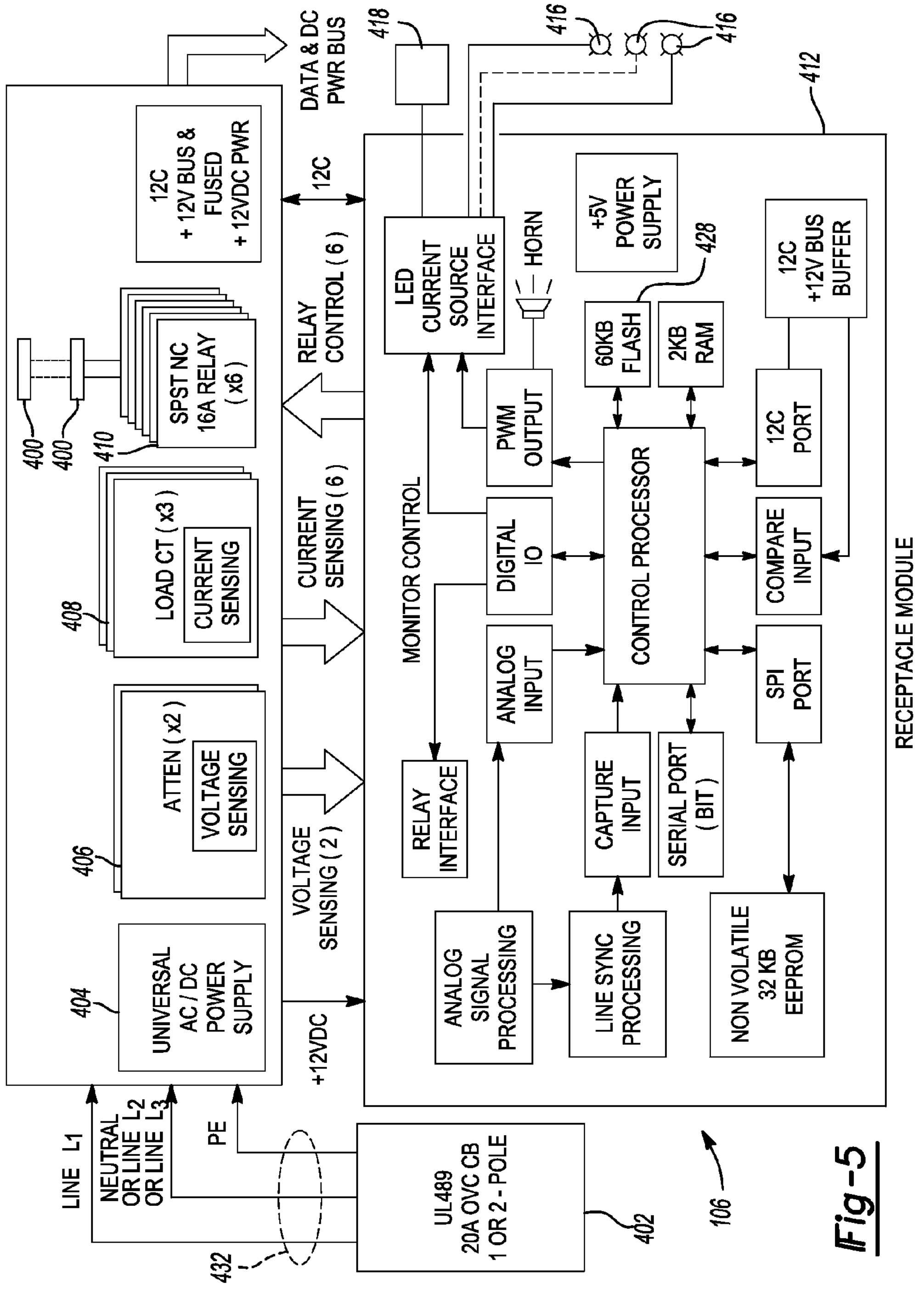
FIG. 5 is a block diagram of a circuit architecture for the receptacle module of FIG. 4.

FIG. 4 shows an illustrative embodiment of a receptacle module 106 and FIG. 5 is a block diagram of an illustrative circuit architecture for receptacle module 106. Receptacle module 106 includes a housing 401 having a plurality of plug receptacles 400 into which plugs of cord connected electronic devices, such as servers, are inserted. In the illustrative embodiment shown in FIGS. 4 and 5, receptacle module 106 has six plug receptacles 400. It should be understood that receptacle module 106 can have more or less than six plug receptacles 400. Receptacle module 106 receives power from the power rail 102 on which receptacle module 106 is mounted and provides that power to the plug receptacles 400, which is illustratively single phase AC power. It should be understood that variants of the receptacle modules can provide polyphase AC power, such as two or three phase VAC. The type of plug receptacle that a receptacle module has depends on the type of power that it distributes. This power from power rail 102 comes into receptacle module 106 through a circuit breaker 402 of receptacle module 106.

Receptacle module 106 includes a universal AC/DC power supply 404, voltage sensing circuit 406, current sensing circuits 408, relays 410 and monitor/control circuit 412. The power lines to the line or power input side of circuit breaker 402 are provided to AC/DC power supply 404 to provide power to AC/DC power supply 404. That is, the power to the AC/DC power supply 404 illustratively is not routed through circuit breaker 402, but comes directly from power rail 102. The power lines 432 (hot and neutral lines) from the supply or output side of circuit breaker 402 are coupled to voltage sensing circuits 406, the outputs of which are coupled to monitor/control circuit 412. (Illustratively, there is a voltage sensing circuit 406 for each hot line and the neutral line.) In an aspect, the hot lines pass through respective current sensing circuits 408, illustratively one for each hot line. In an aspect, branches of the hot lines also pass through respective current sensing circuits 408, illustratively one for each plug receptacle 400, to one side of respective relays 410, illustratively one for each plug receptacle 400. The relays 410 switch the hot line to each of the plug receptacles 400 to turn them on and off under control of the monitor/control circuit 412. Outputs of current sensing circuits 408 are coupled to monitor/control circuit 412. In an aspect, receptacle module 106 also includes connections to the DC and communications busses of power rail 102 when receptacle module 106 is mounted on power rail 102 and monitor/control circuit 412 thus coupled to the DC and communications busses of power rail 102. In an aspect, an output of AC/DC power supply is coupled to a power line of the communications bus of power rail 102 which is provided through power entry module 104 to communications module 209 to provide secondary DC power to communications module 209. In an aspect, monitor/control circuit 412 monitors voltages and currents in receptacle module 106, such as the voltage(s) of the AC power and the currents flowing through each plug receptacle 400, such as to determine the power being consumed by the devices plugged into plug receptacles 400 and to sense fault conditions. In an aspect, if monitor/control circuit 412 senses an over current condition for one of the plug receptacles 400, it opens the relay for that plug receptacle 400 to shut power off to the plug receptacle 400. Monitor/control circuit 412 also communicates this data via the communication bus of the power rail 102 to other devices, such as to other receptacle modules 106, the power entry module 104, and/or to a host (not shown). In an aspect, upon voltage sensing circuit(s) 406 sensing that the voltage on a hot line (or lines) from the supply side of circuit breaker 402 is less than a reference voltage, monitor/control circuit 412 determines that circuit breaker 402 has been tripped, either due to an over current condition or manually to turn the power to receptacle module 106 off. Illustratively, the reference voltage may be 80% of the rated voltage.

In an aspect, receptacle module 106 also includes visual status indicators 416, such as light emitting diodes, for each plug receptacle 400. Monitor/control circuit 412 illustratively illuminates each indicator 416 when its plug receptacle 400 is powered, turns it off when its plug receptacle 400 is not powered, and flashes it when an alarm condition for its plug receptacle 400 exists. Receptacle module 106 also includes a display 418, such as a seven segment LED display, that can be used to display the IP address and the unique identifier (discussed below) of the receptacle module 106. The addresses of the receptacle modules 106 are assigned, as by a host computer or controller, during set-up. Since it is often important that the host computer or controller know what plug receptacle 400 a piece of equipment is plugged into, display 418 identifies the address of the receptacle module 106 so that a technician knows based on this address and the position of the plug receptacle 400 which receptacle module 106 that a piece of equipment is plugged into.

Figure 24:
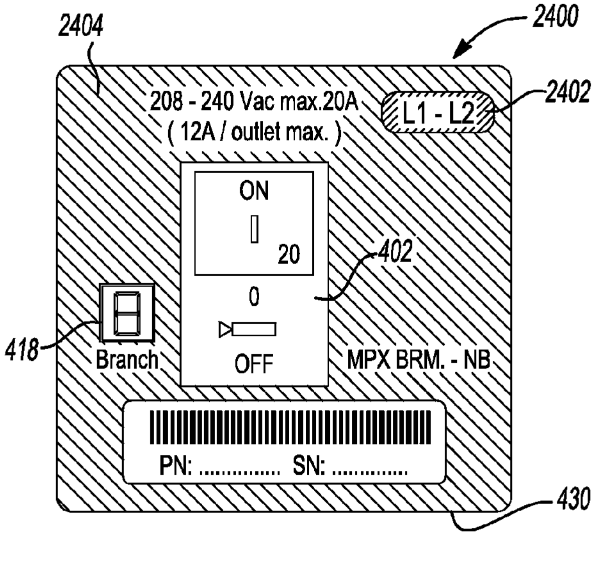
FIG. 24 is a top view of a label for the receptacle module of FIG. 4 and associated color code chart.

In an aspect, each receptacle module 106 has a label 430 that indicates its power rating and configuration, the power configuration being which hot line or lines L1, L2, L3 it utilizes to distribute power to each of its plug receptacles 400 and whether a neutral is utilized. With reference to FIG. 24, a portion 2400 of this label 430 is illustratively color coded, shown by the hashed lines 2402 of portion 2400 of label 430, to indicate the power configuration—which poles L1, L2, L3 are used. This facilitates balancing the power distribution on a power rail 102 as a user can more easily see which poles are being used by a receptacle module 106 to distribute power to its plug receptacles 400. Example of color codes are shown in FIG. 24. The overall background 2404 of label 430 may also be color coded to indicate whether the receptacle module 106 is configured for North American or European power standards. For example, background 2402 may be black to indicate that the receptacle module 106 is configured for North American power standards and may be silver to indicate that the receptacle module 106 is configured for European power standards.

With reference to FIGS. 2 and 4, the power entry module 104 has end caps 212 and receptacle module 106 has end caps 421. The end caps may include screw recesses 220 and screw holes 222 that receive screws that secure the modules to which the end caps are attached to the power rail 102. Alternatively, the end caps 212 and 421 may include hook members (not shown) that hook into the power rail 102 to secure the power entry module 104 and the receptacle module 106 to the power rail 102.

Figure 6:
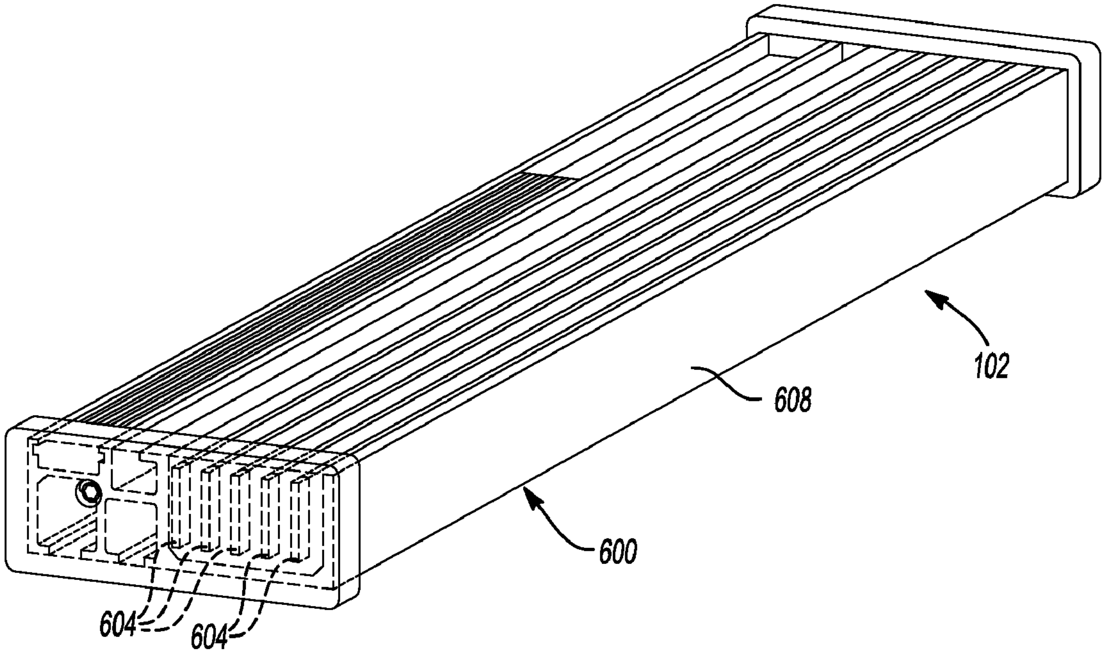
FIG. 6 is a plan view of a power rail of the adaptive power strip of FIG. 1.
Figure 7:
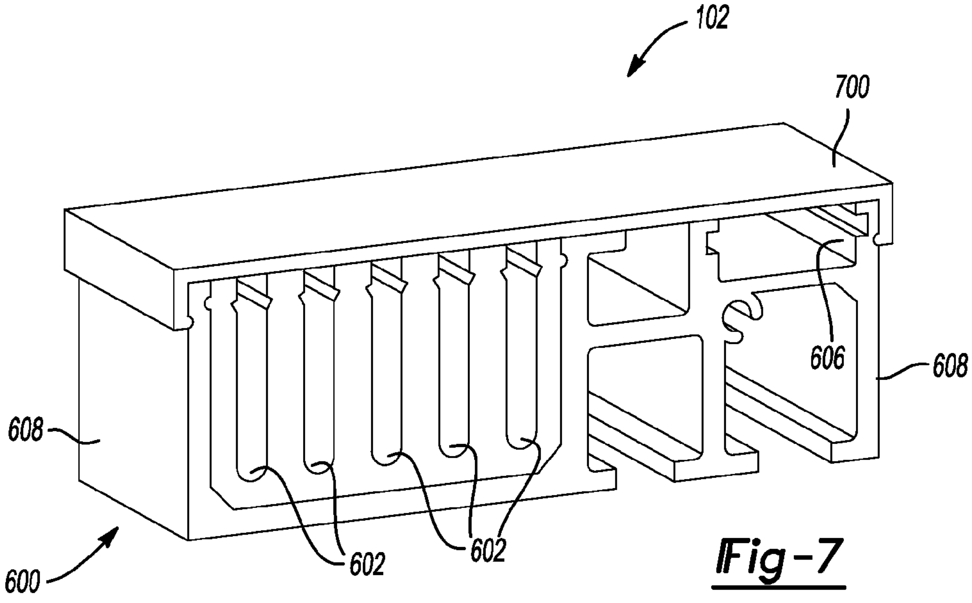
FIG. 7 is a perspective end view of a chassis of the power rail of FIG. 6.
Figure 8:
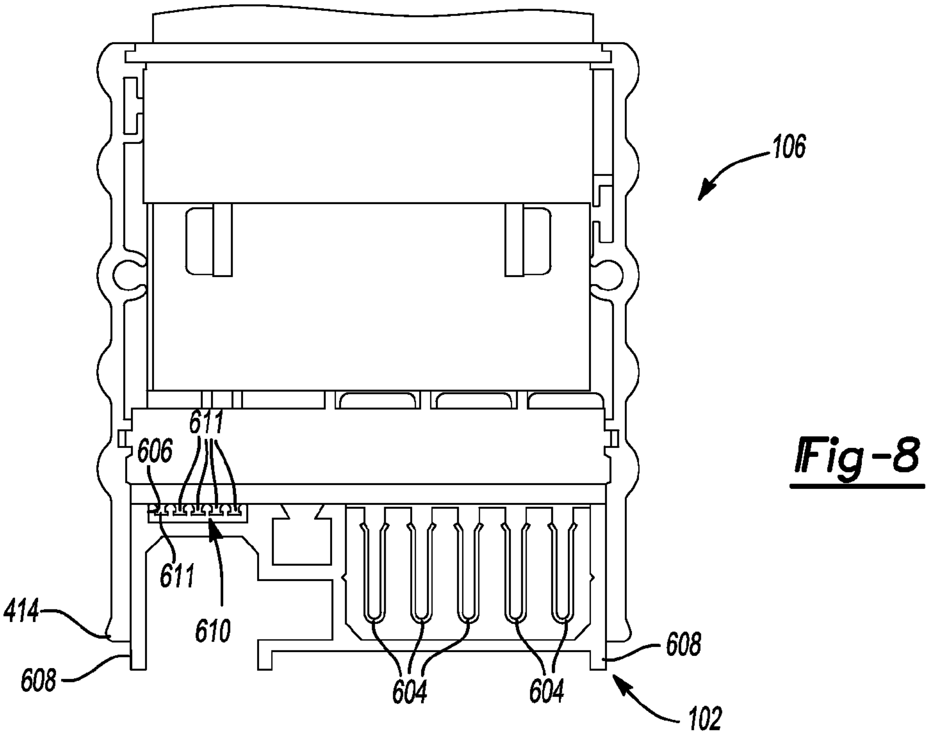
FIG. 8 is a cross-section view of the adaptive power strip of FIG. 1 showing a receptacle module mounted thereon.
Figure 9B:
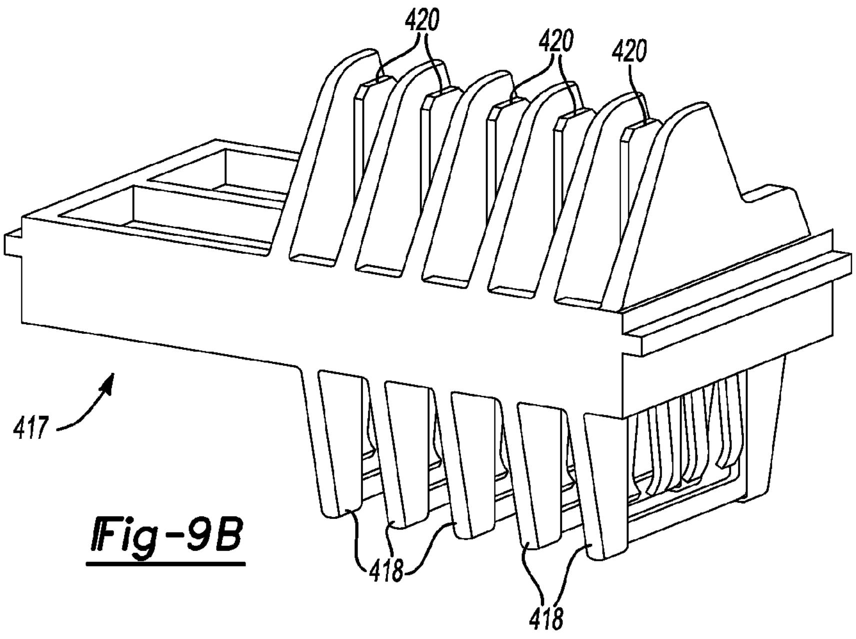
FIGS. 9A and 9B are perspective views of a contact block for the receptacle module of FIG. 4.
Figure 9A:
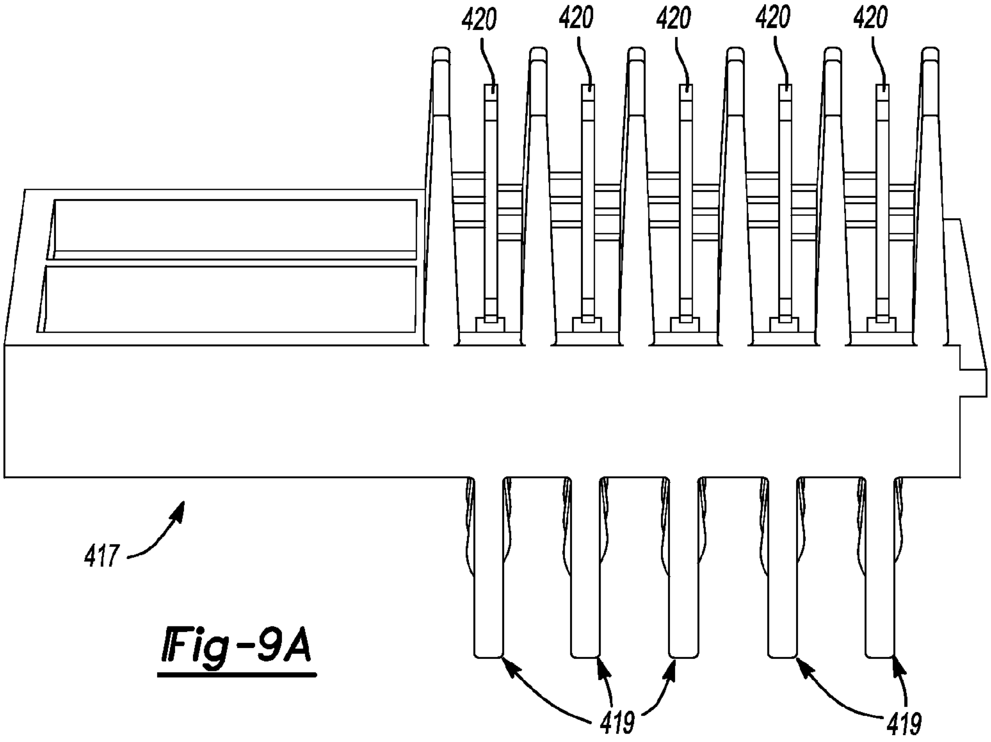

With reference to FIGS. 6-8, an illustrative embodiment of a power rail 102 is described. FIG. 6 is a plan view of power rail 102, FIG. 7 is a perspective end view of chassis 600 of power rail 102 along with a cover 700, and FIG. 8 is a cross-sectional view of an adaptive power strip 100 showing a receptacle module 106 mounted on power rail 102. Power rail 102 has a longitudinally extending chassis 600 having slots 602 in which conductors 604 for the AC bus are disposed. In the illustrative embodiment shown in FIGS. 6-8, the power rail 102 distributes three phase AC power and has five conductors 604 for the AC bus, one for each of the three hot legs (L1, L2, L3), one for neutral, and one for system ground. Conductors 604 run along the length of chassis 600 and may illustratively be bus bars contactable at any point along their lengths. As best shown in FIG. 8, each conductor 604 is a female terminal that runs the length of chassis 600 and may illustratively be a U-shaped member running the length of chassis 600 wherein the opposed sides of the U-shaped member are resiliently urged against the terminals of power entry module 104 and receptacle modules 106 when they are mounted on power rail 102. The conductors 604 other than for the system ground are illustratively disposed in chassis 600 of power rail at a greater depth than the conductor 604 for the system ground. As best shown in FIG. 7, the left most slot 602 the slot in which the system ground is disposed. The depth of this slot 602 is less than the depth of the other slots 602 so that the system ground conductor 604 is higher than the other conductors 604. Consequently, when a module, such as receptacle module, is mounted on power rail 102, the system ground contact of the receptacle module will contact the conductor 604 for the system ground before the remainder of the power contacts of the receptacle module make contact with the other conductors 604 of the AC bus of the power rail 102. This provides hot swappable capability.

With reference to FIG. 8, chassis 600 includes a channel 606 in which communication bus 610 runs along the length of power rail 102. Communication bus 610 may illustratively be an $I^2C$ bus, as discussed, and may have five conductors 611. The conductors of communication bus 610 may also be bus bars contactable at any point along their lengths. They may similarly be female terminals running the length of chassis 600 and may similarly be U-shaped members. Since the current that flows through the conductors of the communication bus 610 is much lower than the current that flows through the conductors 604 of the AC bus, the conductors of communication bus 610 can be smaller.

As can be seen in FIGS. 6-8, the power rail 102 has a low profile form factor and is open on the sides. That is, the power rail 102 has a flat top and the modules, such as a receptacle module 106, have opposed flanges 414 that extend down along opposed sides 608 of power rail 102. Opposed sides 608 and opposed flanges 414 may have complimentary features that mate with each other to secure the module to the power rail. In an aspect, the opposed flanges may extend down the opposed sides 608 to below the bottom of the power rail and have features that project inwardly toward each other to secure the module to the power rail.

Figure 10A:
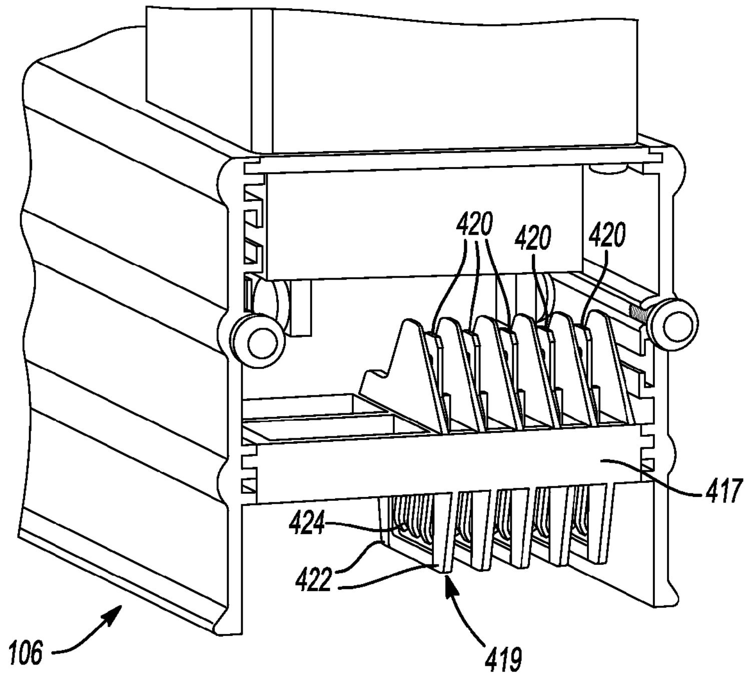
FIGS. 10A and 10B are perspective views showing the contact block of FIGS. 9A and 9B in the receptacle module of FIG. 4.
Figure 10B:
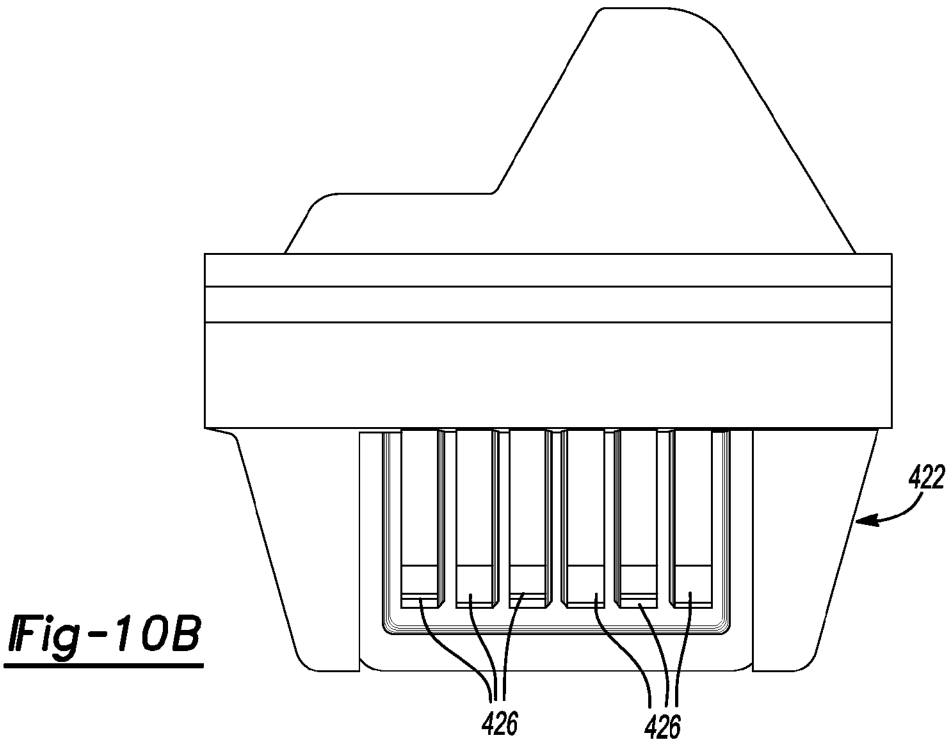

With reference to FIGS. 9A, 9B, 10A and 10B, the receptacle module 106 includes contact block 417 having blades 419 that mate with the slots in power rail 102 in which conductors 604 of power rail 102 run. Each blade 419 illustratively includes shrouds 422 between which contacts 424 are disposed. Each contact 424 illustratively has a lower portion having one or more pairs of opposed spring contacts 426 and an upper portion having a terminal 420. Wires (not shown) connect terminals 420 to plug receptacles 400. Blades 419 are disposed in contact block 417 so that the system ground contact mates first with the system ground conductor of the AC bus of power rail 102 for hot swappable purposes. As best shown in FIG. 10B, shrouds 422 help prevent contacts from being touched and help guide blades 419 when they are inserted into the slots of the power rail 102.

Receptacle modules 106 can be configured to have different power topologies, which may also be referred to as power configurations. By way of example and not of limitation, these include three phase AC power, single phase line to line power, or single phase line to neutral. In an aspect, a switch is provided that provides the appropriate interconnection between the blades 419 of contact block 417 and plug receptacles 400. The switch can be moved to different positions to provide different interconnections and thus different power topologies. In an aspect, one or more blades 419 are omitted from contact block 417 to provide the appropriate power topology. For example, in a single phase line to neutral topology, only the ground blade, one of the line blades and the neutral blade are used in contact block 416. In another aspect, contact block 417 has all the blades, but only the blades pertinent to that particular power topology are connected to the plug receptacles 400. For example, in a single phase line to line topology, only the ground and two of the line blades are connected to the plug receptacles 400.

Figure 11A:
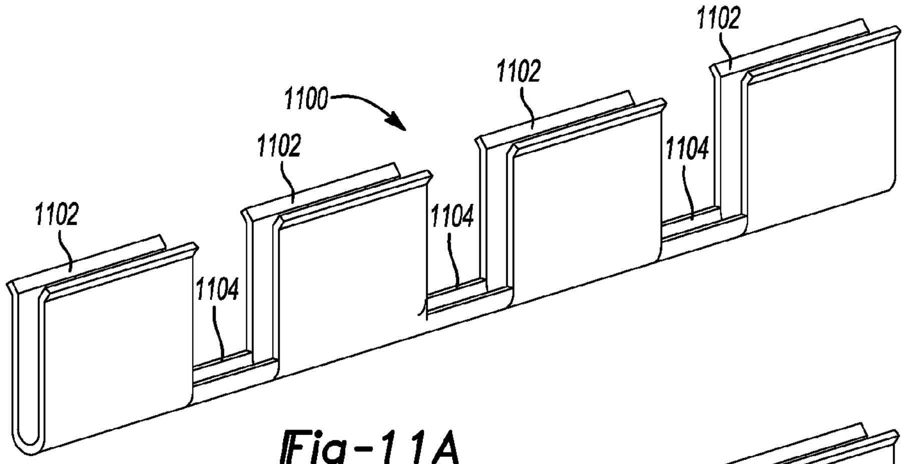
FIGS. 11A and 11B are perspective views of embodiments of resistive elements of the power rail of FIG. 6.
Figure 11B:
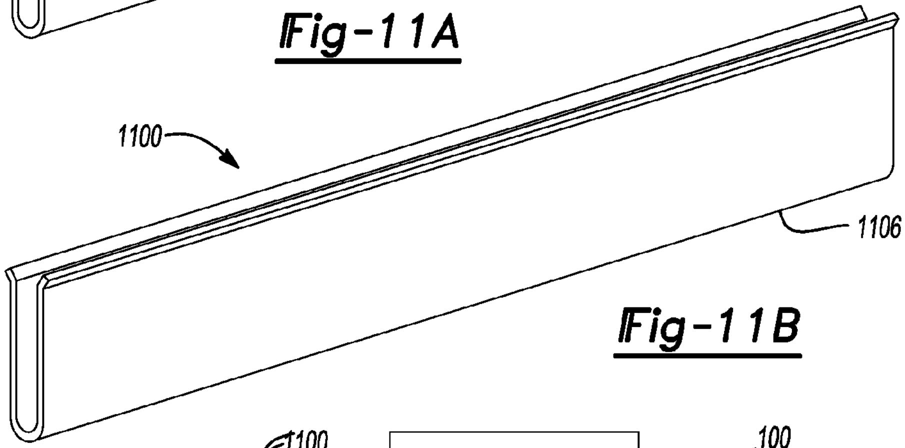

With reference to FIG. 11A, an embodiment of a resistive element 1100 that runs along power rail 102 for use by the modules in determining their position on the power rail 102 is described. The resistive element 1100 includes a segmented conductor having a plurality of conductors 1102 with ends of adjacent conductors 1102 bridged by a resistor 1104, such as a surface mount resistor. The power entry module illustratively provides a DC voltage at one end of the resistive element 1100. Each receptacle module has a contact that contacts one of the conductors 1102 when the receptacle module is mounted on the power rail. The receptacle module senses the voltage on that conductor 1102 and generates information indicative of its position on power rail 102 relative to power entry module 104 based on the voltage that it senses. It then sends this information to communication module 209 via communications bus 610. Communication module 209 determines the position of the receptacle module 106 on the power rail 102 relative to power entry module 102 based on this information. The voltage will drop from conductor 1102 to conductor 1102 due to the resistor between adjacent conductors. FIG. 11B shows another embodiment of resistive element 1100 where resistive element 1100 is a carbon plated conductor 1106 that traverses the length of communication bus 610 of power rail 102. The resistance of the carbon plated conductor 1106 continuously increases along its length, starting at an end closest to power entry module 104. Illustratively, resistive element 1100 is disposed in channel 606 of chassis 600 of power rail 102.

Figure 11C:
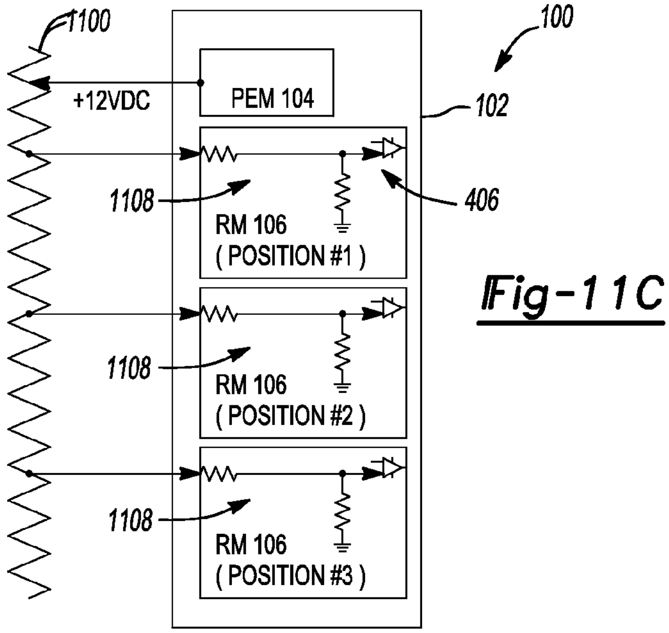
FIG. 11C is a basic schematic of receptacle modules having location identification circuitry coupled to the resistive element of either FIG. 11A or 11B.

FIG. 11C is a simplified schematic of an embodiment of adaptive power strip 100 having resistive element 1100 that is used by receptacle modules 106 to determine their position on power rail 102. Each receptacle module 106 includes a voltage sensing circuit, such as a voltage sensing circuit 406, that in this case has a resistance divider input 1108 that contacts resistive element 1100 when the receptacle module 106 is mounted on the power rail 102. The power entry module 104 applies a 12 VDC bias voltage to the resistive element 1100. The voltage sensing circuit 406 of each receptacle module 106 senses the voltage at the point on resistive element 1100 to which its resistance divider input 1108 is connected. This voltage varies along the length of resistive element 1100, becoming lower as the distance increases from where the 12 VDC bias voltage is applied by power entry module 104. The voltage sensed by the voltage sensing circuit 406 of the receptacle module 106 is thus proportional to the location of that receptacle module 106 on the power rail 102 relative to power entry module 104. In the embodiment shown in FIG. 11C, the voltage sensing circuit 406 of receptacle module 106 in position 1 will sense the highest voltage on resistive element 1100, the voltage sensing circuit 406 of receptacle module 106 in position 2 will sense a lower voltage on resistive element 1100, and the voltage sensing circuit of receptacle module 106 in position 3 will sense the lowest voltage on resistive element 1100. Monitor/control circuit 412 digitizes the voltage sensed by the voltage sensing circuit 406 at the point where its voltage divider input 1108 is connected to resistive element to generate information indicative of the location of the receptacle module 106 on the power rail 102. Monitor/control circuit 412 sends the digitized voltage to communications module 209. This digitized voltage is proportional to the location of the receptacle module 106 on power rail 102 relative to power entry module 104. Communications module 209 then determines the location of that receptacle module 106 on the power rail 102 relative to power entry module 102 based on this digitized voltage.

Figure 12:
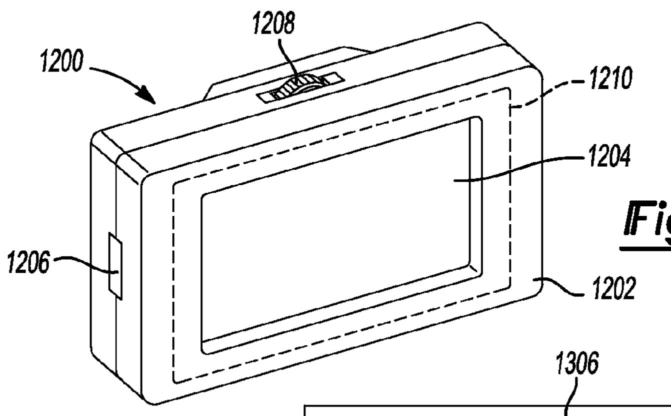
FIG. 12 is a perspective view of a display module.

FIG. 12 shows a display module 1200 that is an example of display module 210. In an aspect, the display module 1200 can be removably attached to a receptacle module 106 or a power entry module 104. In an aspect, the display module 1200 can be removably attached to power rail 102. In an aspect, display module 1200 can be remotely positioned from adaptive power strip 100, such as in various locations in the rack, such as rack 1800 (FIG. 18), in which the adaptive power strip 100 is mounted. In an aspect, display module 1200 can be a hand held display. In an aspect, display module 1200 is connected via a cord to an Ethernet port of one of the modules, such as communications module 209. In an aspect, display module 1200 is connected wirelessly with one (or more) of the modules, such as communications module 209.

In an aspect, display module 1200 displays information about the entire adaptive power strip 100, the receptacle modules 106, and the individual plug receptacles 400 of the receptacle modules 106 of the adaptive power strip 100 (depending on what information is available for each). In an aspect, display module 1200 displays the Internet Protocol address of the adaptive power strip 100 (e.g. the IP address assigned to communications module 209 of the power entry module 104 of the adaptive power strip 100). In an aspect, display module 1200 displays a media access control (MAC) address of the adaptive power strip 100. In an aspect, display module 1200 displays this information about one or more secondary adaptive power strips 100 that are connected to a primary adaptive power strip, such as in a private network configuration. As used herein, a secondary adaptive power strip 100 is one or more other adaptive power strips 100 that are connected to a primary adaptive power strip 100, such as via an Ethernet connection. As used herein, the primary adaptive power strip 100 is the adaptive power strip 100 that is connected (directly or indirectly) to a host, such as via an Ethernet connection, wireless connection, or via the Internet.

With reference to FIGS. 12-15, display module 1200 is described in more detail. Display module 1200 may illustratively be a hand-sized device that when plugged into communications module 209 allows a user to view parametric data of adaptive power strip 100, such as may pertain to and be stored in any or all of communications module 209, power entry module 104 (such as in monitor/control circuit 204), and receptacle module 106 (such as in monitor/control circuit 412.) Display module 1200 includes a housing 1202 having a display screen 1204, such as an LED display screen. Display module 1200 also includes a data port 1206, which may illustratively be an Ethernet port, and a navigation device 1208, which may illustratively be a scroll wheel. Display module 1200 also includes a control circuit 1210 shown in phantom in FIG. 12 that controls display module 1200 including its data communications with communications module 209. Display module 1200 may illustratively include a programmable device, such as a microprocessor or microcontroller, programmed with software to control display module 1200 and implement the functions of display module 1200 described below.

The parametric data of adaptive power strip 100 that a user can have displayed on display module 1200 includes the power load on the adaptive power strip 100, illustratively, the power load on power lines 232 of power entry module 104 that provide the power to adaptive power strip 100, and depending on the type of receptacle module 106, the power load on each receptacle module 106, illustratively, the power load on power lines 432 of each receptacle module 106, and the power load on each plug receptacle 400 of a receptacle module 106. The parametric data may also include the load on rack devices (equipment plugged into plug receptacles 400 of receptacle modules 106) using user configured labels (labels the user assigns to the rack device). The parametric data may also include temperature/humidity readings if communications module 209 has temperature and humidity sensors connected to it. The parametric data also includes the Internet Protocol address of the adaptive power strip 100, which is illustratively assigned to communications module 209.

Scroll wheel 1208 is used to select different items on display screen 1204. It is rotated to highlight the desired item and depressed to select it. Depressing scroll wheel 1208 once causes summary information of the selected item to be displayed. Depressing scroll wheel 1208 a second time navigates into information for the selected item. For example, with reference to FIG. 13 which shows an illustrative display on display screen 1204, once an item has been selected, scroll wheel 1208 can be rotated to highlight icon 1300 and when scroll wheel 1208 is depressed, additional information is displayed about the selected item. Selecting icon 1302 by highlighting it and depressing scroll wheel 1208 navigates to the next higher level.

Figure 13:
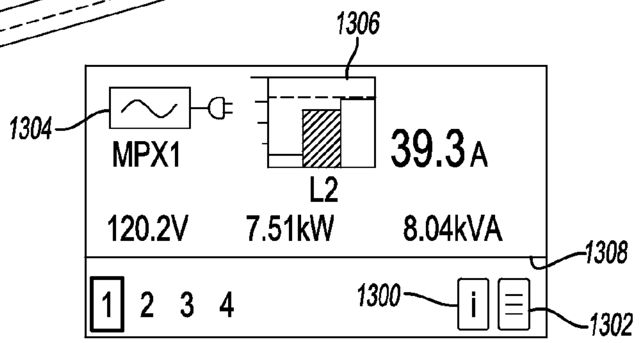
FIG. 13 is a front view of a rack level view of the display module of FIG. 12.

Display module 1200 illustratively has different views for the adaptive power strip 100, receptacle modules 106, and individual plug receptacles 400, which may be referred to as levels, allowing a user to view information (if available) about each of the different modules. FIG. 13 shows an illustrative view at the adaptive power strip level which may be referred to as the RACK PDU Level, which displays power information for the selected adaptive power strip 100 (which may be referred to as a PDU or power distribution unit) illustratively derived from power entry module 104, FIG. 14 shows an illustrative view at a receptacle module 106 level which displays power in formation for a selected receptacle module 106 of a selected adaptive power strip 100, and FIG. 15 shows an illustrative view at a plug receptacle 400 level of power information for a selected plug receptacle 400 of a selected receptacle module 106 of a selected adaptive power strip 100.

With reference to FIG. 13, icon 1304 at the top left indicates that information at the adaptive power strip level, referred to as the Rack PDU Level, is being displayed and beneath icon 1304, is a name of the adaptive power strip 100 about which information is being displayed. (The term “PDU” or “power distribution unit” may sometimes be used to refer to an adaptive power strip 100.) Communication modules 209 may illustratively allow for interconnection so that a number of communication modules 209 (four by way of example and not of limitation) in respective power entry modules 104 of respective adaptive power strips 100 can be networked together such as in a private network. In which case, each of the adaptive power strips 100 is assigned an identifier, such as a subnet address or a number starting at one, such as from 1 to 4 when there are four adaptive power strips 100 connected together in a private network configuration. In a private network configuration, the communication module 209 of the primary adaptive power strip 100 is assigned an Internet Protocol address. That communication module 209 can be connected to communication modules 209 of secondary adaptive power strips 100, illustratively to three communication modules 209, and eliminates the need to have IP addresses assigned to these other three communication modules 209 as remote system communication with these other three communication modules 209 is routed through the first communication module 209 that is assigned the IP address. The numbers at the bottom of the display shown in FIG. 13 indicate the numbers of the adaptive power strips 100 that can communicate to display module 1200. Illustratively, the number of the particular adaptive power strip 100 that is communicating with display module 1200 is identified by flashing its number, which is shown by highlighted number 1 in the display shown on FIG. 13. The Rack PDU Level view displays information collected at the Rack PDU input point, illustratively power entry module 104, for each of the input phases of the input power, which can be one, two or three phases (L1, L2, and/or L3). In the top center of the display shown in FIG. 13, a bar graph 1306 displays the approximate power utilization of each phase of the input power and below bar graph 1306, the label of the currently viewed input phase (L2 in the display shown in FIG. 13) will flash. In an aspect, bar graph 1306 automatically scrolls between each phase of the input power. At the top right of the display shown in FIG. 13, the amperage being drawn on the currently viewed phase of the input power is displayed. Above dividing line 1308, the voltage (V), power in kilowatts (kW) and kilowatt volt amps (kVA) of the selected PDU are displayed from left to right.

Figure 14:
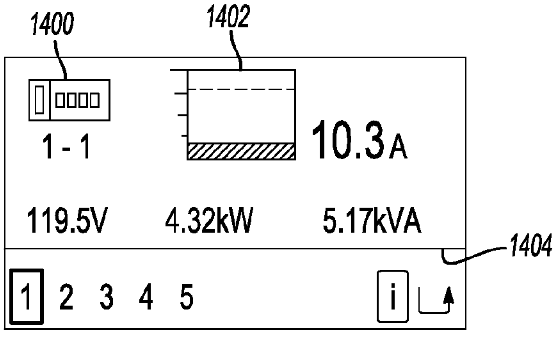
FIG. 14 is a front view of a branch receptacle level view of the display module of FIG. 12.

With reference to FIG. 14, icon 1400 at the top left indicates that power information for a selected receptacle module 106 of a selected adaptive power strip 100 is being displayed. This view may be referred to as the Branch Level view and the information displayed in this view is power information for a selected receptacle module 106. Beneath icon 1400 is a number that indicates the identity of the receptacle module 106 being viewed, in PDU # and Module # format. The PDU # is the number of the particular adaptive power strip having the receptacle module 106 being viewed and the Module # is the number of the receptacle module 106 being viewed, which is the unique identifier that was assigned to that receptacle module 106 during the discovery process as discussed above. Bar graph 1402 at the top center displays the approximate utilization amount of the selected receptacle module 106 and the number to the right of bar graph 1402 displays the amperage being drawn by the selected receptacle module 106. Above dividing line 1404 the voltage (V), power in kilowatts (kW), and the kilowatt volt amps (kVA) of the selected module 106 are displayed from left to right. The numbers beneath dividing line 1404 indicate the number of receptacle modules 106 on that adaptive power strip 100 and the flashing number (highlighted number 1 in FIG. 14) indicates which receptacle module 106 is being viewed.

Figure 15:
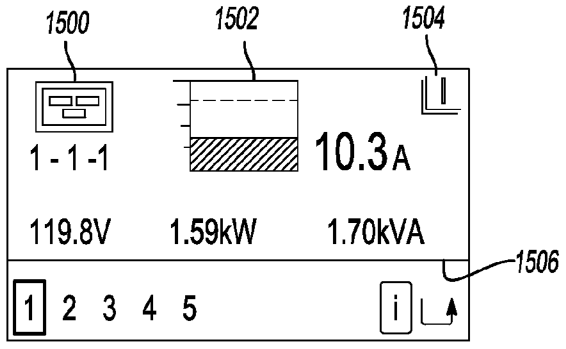
FIG. 15 is a front view of a plug receptacle view of the display module of FIG. 12.

With reference to FIG. 15, icon 1500 at the top left indicates that power information for a selected plug receptacle 400 of a selected receptacle module 106 of a selected adaptive power strip 100 is being displayed. This view may be referred to as the Receptacle Level view and the information displayed in this view is power information for a selected plug receptacle 400. Beneath icon 2500 is a number that indicates the identity of the selected plug receptacle 400 being viewed, in PDU #, Module # and Receptacle # format. The PDU # is the number of the particular adaptive power strip 100 having the receptacle module 106 that has the plug receptacle 400 being viewed, the Module # is the unique identifier assigned to that receptacle module 106, and the Receptacle # is the number of the selected receptacle being viewed. Bar graph 1502 at the top center displays the approximate utilization amount of the selected plug receptacle 400 and the number to the right of bar graph 1502 displays the amperage being drawn by the selected plug receptacle 400. ON/OFF icon 1504 at the top right indicates whether the relay 410 for the selected plug receptacle 400 is closed or open. In the illustrative example shown in FIG. 15, an "I" displayed in ON/OFF indicates that the relay 410 is closed and plug receptacle 400 is powered and an "0" indicates that the relay 410 is open and plug receptacle 400 is not powered. Above dividing line 1506 the voltage (V), power in kilowatts (kW), and the kilowatt volt amps (kVA) of the selected plug receptacle 400 are displayed from left to right. The numbers below the dividing line 1506 indicate the number of receptacles 400 that the receptacle module 106 has and the flashing number (highlighted number 1 in FIG. 15) indicates which plug receptacle 400 is being viewed.

In an aspect, when an adaptive power strip is first turned on, a unique address is assigned to each power entry module and receptacle module over the communication bus. Commands sent over the communication bus also cause an LED on each module to flash. A user can turn receptacle modules, or individual plug receptacles in a receptacle module, on and off via commands sent over the communication bus, such as from a host.

In an aspect, the power entry module 104 on a power rail 102 conducts a discovery process when a new receptacle module 106 is placed on the power rail 102. In an aspect, communications module 209 of power entry module 104 conducts this discovery process, as shown in the flow chart of FIG. 20, and is programmed with a software program to implement the discovery process shown in the flow chart of FIG. 20. In this aspect, each receptacle module 106 has a data structure consisting of device parameters stored in memory, such as in flash memory 428 (FIG. 5) of monitor/control circuit 412. Illustratively, this data structure is first stored in flash memory 428 prior to its delivery to a user of receptacle module 106, such as during the manufacture of receptacle module 106. These device parameters identify physical, configuration and performance related characteristics of the receptacle module 106. These device parameters may include a parameter identifying that the device is a receptacle module, the firmware version of the firmware of the module, a parameter indicative of the form factor of the module (such as the length of the module), a parameter identifying the line voltage frequency of the module (i.e., 50 Hz or 60 Hz), a parameter identifying the line voltage rating of the module, such as where a unit value equals Volts RMS (e.g., each increment equaling 1 V), a current rating of the module, such as where a unit value equals Amps RMS (each increment equaling 1 A), and a parameter whose value identifies a region of intended use, such as North America, European, International, or unknown. They may also include a unique serial number of the receptacle module 106, a model number of the receptacle module 106, and the firmware version of the firmware of monitor/control circuit 412 and a module identification. The model number may include information that illustratively identifies characteristics and device options of the particular receptacle module 106. These may include whether all the relays can be individually controlled or whether they are controlled collectively, whether the relays are open or closed in the non-energized state, whether the branch supply can be monitored by the receptacle module 106, whether the individual receptacles can be monitored by the receptacle module 106, and the number of receptacles that the receptacle module 106 has.

Figure 20:
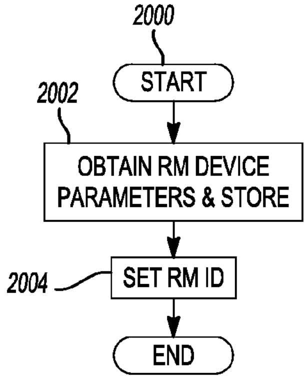
FIG. 20 is a flow chart of a discovery process conducted by a communications module of the power entry module in accordance with an aspect of the present disclosure.

Referring now to the flow chart of FIG. 20, when a receptacle module 106 is first placed on a power rail 102, communication module 209 of the power entry module 104 on the power rail 102 starts the discovery process at 2000. At 2002, the communication module 209 queries the receptacle module 106 for the device parameters of that receptacle module 106 and stores the appropriate device parameters in a data structure in memory 212 (FIG. 3). In an aspect, the communications module 209 also queries (which may be part of the same query) the receptacle module 106 for its location on power rail 102, which receptacle module 106 determines as discussed above with reference to FIG. 11 C. Communication module 209 then sets a unique identifier for the receptacle module 106 at 2004 which it sends to the receptacle module 106. The receptacle module 106 stores this unique identifier in memory, such as flash memory 428. This unique identifier is displayed on seven segment LED display 418 of receptacle module 106, such as when receptacle module 106 is commanded to do so via communication module 209. Each receptacle module 106 on a power rail 102 will be assigned a unique identifier by the communication module 209 of the power entry module 104 when each receptacle module 106 is first placed on the power rail 102. Each receptacle module 106 on a power rail 102 will thus have a unique identifier. This unique identifier when displayed on the LED display 418 of a receptacle module 106 identifies the particular receptacle module 106 to users, such as technicians, to facilitate use and troubleshooting. For example, if a user wants to determine what equipment is plugged into a particular plug receptacle 400, the user needs to know what receptacle module 106 on a power rail 102 has the particular plug receptacle 400 and can determine this by looking at the unique identifier displayed on display 418 of the receptacle module 106 having the particular plug receptacle 400. Once a receptacle module 106 has had a unique identifier assigned to it, this unique identifier will be retained in memory of receptacle module 106, such as flash memory 428, until it is cleared such as by a user initiating a "Restore Factory Defaults" command. If a user initiates this command, the unique identifier is cleared and the receptacle module 106 returned to the "no unique identifier assigned" state. In this regard, if a receptacle module having a unique identifier assigned to it is moved to a different power rail 102, it retains its unique identifier unless there is a conflict with the unique identifier assigned to another receptacle module on that different power rail in which case the conflict is resolved by a new unique identifier being assigned to it or a user alerted to the conflict who then removes one of the conflicting receptacle modules from the power rail 102 or determines which conflicting receptacle module 106 is to be assigned a new unique identifier.

In an aspect, LED 418 has a portion that indicates that the receptacle module 106 has not yet been discovered by the communications module on the power rail 102. By way of example and not of limitation, LED 418 has a decimal point that is illuminated when the receptacle module 106 has not yet been discovered (but after it has been assigned the unique identifier). For example, if a receptacle module 106 is removed from a power rail 102 and then placed back on it, a few seconds will expire before the communications module 209 "rediscovers" it. Similarly if the receptacle module 106 is moved to a new power rail 102, a few seconds will expire before the communications module 209 of the power entry module 104 on that new power rail 102 discovers the receptacle module 106. The unique identifier that had been assigned to that receptacle module 106 during the initial discovery process will be displayed along with the decimal point. When the communications module 209 discovers the receptacle module 106, the decimal point is cleared or turned off.

During the initial discovery process, the receptacle modules 106 will be assigned sequential unique identifiers with the lowest unique identifiers assigned to the receptacle modules 106 on power rail 102 closest to the power entry module 104. That is, the receptacle module 106 on power rail 102 closest to the power entry module 104 will be assigned a unique identifier of 1, the receptacle module 106 on power rail 102 next closest to power entry module 104 will be assigned a unique identifier of 2, and so on until all the receptacle modules on power rail 102 are assigned unique identifiers. If the receptacle modules are then removed from power rail 102 and their locations on it shuffled when they are put back on power rail 102, they retain their unique identifiers regardless of their new physical ordering on power rail 102.

In an aspect, the unique identifier displayed on LED 418 is flashed on and off when circuit breaker 402 is open, illustratively by monitor/control circuit 412. In an aspect, receptacle module 106 is responsive to a remote command to flash its unique identifier on and off on LED 418, such as may be sent from a host system via communications module 209 of power entry module 104. Illustratively, monitor/control circuit 412 flashes the unique identifier on and off on LED 418 in response to the remote command. This provides for identification of the receptacle module 106, such as to a technician, where the technician needs to know the unique identifier assigned to the receptacle module 106.

In an aspect, where receptacle module 106 includes the capability for managing individual receptacles 400, in addition to flashing its unique identifier on and off on LED 418 in response to a remote command, the receptacle module 106 also flashes the LED 416 associated with an individual plug receptacle 400 on and off in response to a remote command. Illustratively, monitor control circuit 412 flashes the individual LED 416 on and off in response to the remote command.

The communication module 209 of a power entry module 104 on a power rail 102 will thus have a data structure stored in memory with information about each receptacle module 106 mounted on that power rail 102 that illustratively includes characteristics and capabilities of each receptacle module 106, its unique identifier and its location on power rail 102. Communications module 209 provides access to this information for use in the monitoring and control of receptacle modules 106 on the power rail 102. In this regard, communications module 209 maintains an inventory of the receptacle modules 106 on the power rail 102 and their capabilities. For example, if a user wants to find information about a particular receptacle module 106 on the power rail 102, the user accesses the information in communications module 209 about that receptacle module 106, either via a remote system communicating with communications module 209 or via display module 210, as more fully described below. In an aspect, the commands that can be used to program receptacle modules 106, such as setting parameters in them, vary depending on the capabilities of the receptacle modules 106. As discussed above, the receptacle modules 106 can have different capabilities. The information stored in communications module 209 about the receptacle modules on the power rail 102 can be accessed such as by a remote system to determine the functionality of each receptacle module 106 on the power rail 102 and thus which commands can be used to program it. Communications module 209 can also use this information in determining how to display power monitoring data from each receptacle module 106 having monitoring capability, such as whether to display the voltage as 120 VAC, single pole, 230 VAC double pole, or the like.

When a receptacle module 106 is first manufactured, it does not have the unique identifier. Its LED display 418 will when the receptacle module is first installed on a power rail 102 flash its segments in sequence to indicate this state where it has not yet had a unique identifier assigned to it.

The above discussed discovery process facilitates the use of receptacle modules 106 with varying capabilities on the same power rail 102. By way of example and not of limitation, a receptacle module 106 can be a "dumb" receptacle module which does not have any monitoring or control capability. Such a dumb module may for example have only circuit breaker 402 and plug receptacles 400. A receptacle module 106 may only have branch monitoring capability. Such a branch monitoring only receptacle module 106 would have voltage sensing circuits 406 but not current sensing circuits 408 and relays 410. A receptacle module 106 may have branch monitoring and receptacle control. Such a branch monitoring and receptacle control receptacle module 106 would then have voltage sensing circuit 406, relays 410 but not current sensing circuits 408. A receptacle module 106 may have branch and receptacle monitoring and receptacle control. Such a branch and receptacle monitoring and receptacle control receptacle module 106 would then have voltage sensing circuits 406, current sensing circuits 408 and relays 410.

Figure 21:
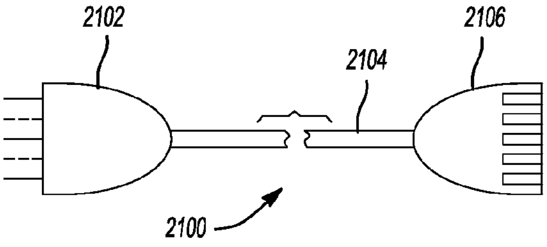
FIG. 21 is a side perspective view of a cordset that connects the power entry module of FIG. 2 to a source of AC power.

In an aspect, power entry module 104 can be used with varying types of input power and in this aspect, detects the input power provided to it, configures itself and controls receptacle modules 106 accordingly. In an aspect, power entry module 104 detects the input power provided. As shown in FIG. 21, a cordset 2100 has a male plug 2102 coupled by a cord 2104 to a female plug 2106. Female plug 2106 plugs into the high power inlet 200 of power entry module 104 and male plug 2102 plugs into a source of power. The male plug has the appropriate configuration to mate with a receptacle of a power source (not shown) that provides the power for adaptive power strip 100. For example, in the U.S. a three-terminal plug is often used for 120 VAC single phase AC having a hot line, neutral line, and a ground line (e.g., 1 pole, 3 wire service). A different type of three terminal plug may be used for single phase 240 VAC having two hot lines (L1, L2) and a ground (e.g., 2 pole, 3 wire service). A four terminal plug may be used for delta three-phase 208 VAC having three hot lines (L1, L2, L3) and a ground line (e.g., 3 pole, 4 wire service). A five terminal plug may be used for "WYE" three-phase 120/208 VAC having three hot lines (L1, L2, L3), a neutral line and a ground line (e.g., 3 pole, 5 wire service). The female plug has the appropriate configuration to plug into high power inlet 200 of power entry module 104, but may not have a terminal corresponding to each terminal of high power inlet. For example, in this aspect high power inlet 200 includes a five terminal receptacle having three hot terminals (L1, L2, L3), a neutral terminal and a ground terminal. If the power being provided to adaptive power strip 100 is single pole 120 VAC, female plug 2106 of cordset 2100 would have the appropriate configuration to plug into high power inlet 200 but may only have three terminals, a hot terminal (L1), a neutral terminal and a ground terminal, which would mate with the corresponding terminals of high power inlet 200. Female plug 2106 could have all five terminals, but with only the hot terminal (L1), neutral terminal and ground terminal wired to male plug 2102 by cord 2104.

In the aspect where power entry module 104 detects the input power provided to it, there is illustratively a capacitor across the line inputs 232 to AC/DC power supply 208 of power entry module 104, shown representatively in phantom by capacitor 234 in FIG. 3. Line inputs 232 illustratively include three hot lines (L1, L2, L3), a neutral line and ground line (as shown in FIG. 3). A neutral, if available from cordset 2100, is grounded at the distribution. An unconnected neutral will present a voltage due to the impedance of the capacitor.

Figure 22:
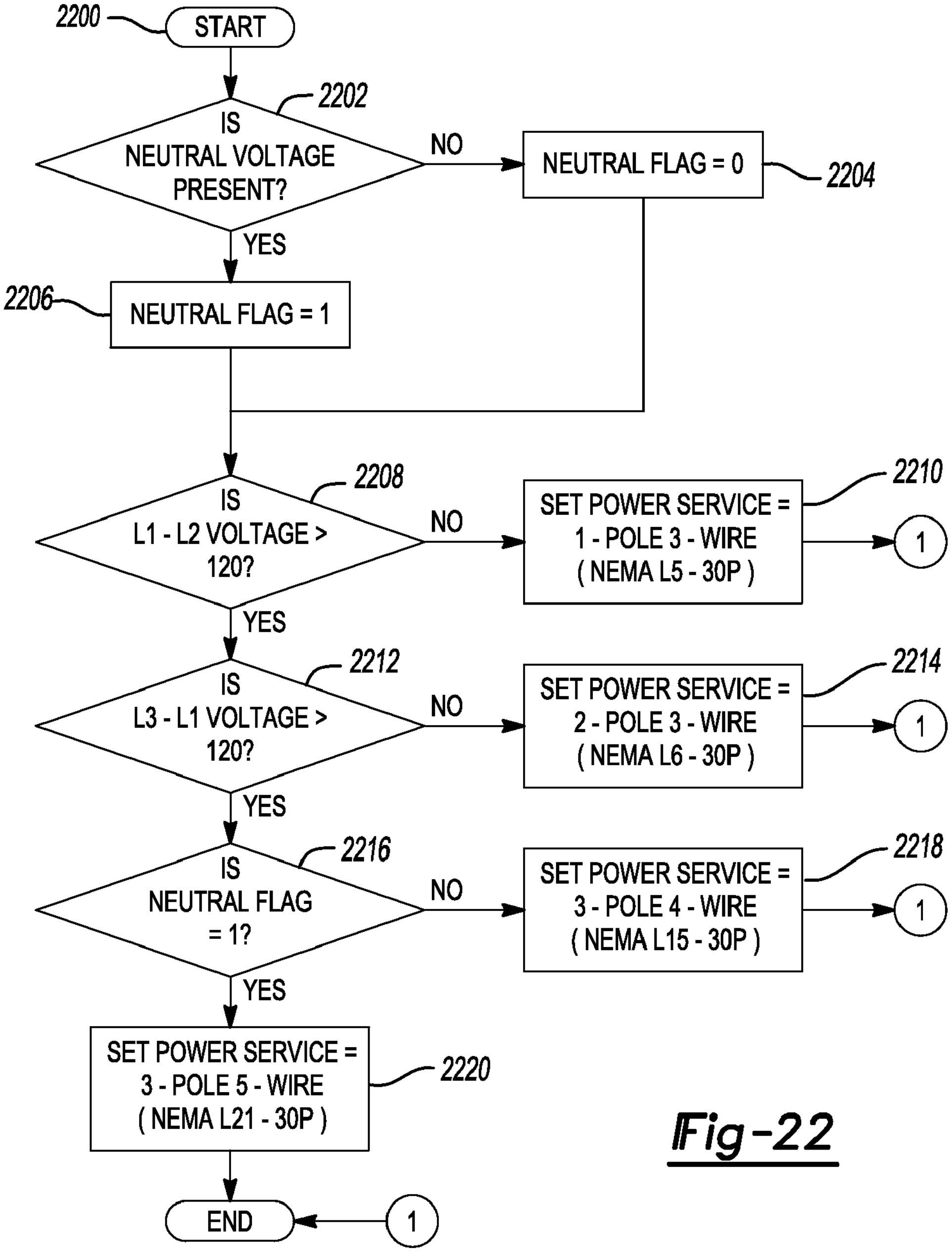
FIG. 22 is a flow chart of a power self-configuration process conducted by the power entry module of FIG. 2 in accordance with an aspect of the present disclosure.

Monitor/control circuit 204 of power entry module 104 is illustratively programmed with a software program that implements the power self-configuration process of power entry module 104, illustratively shown in the flow chart of FIG. 22. With reference to FIG. 22, the power self-configuration process starts at 2200. At 2202, monitor/control circuit 204 checks whether a neutral voltage is present on the line inputs 232 (FIG. 3) to AC/DC power supply 208. If a neutral voltage is not present, monitor/control circuit sets a neutral flag to 0 at 2204 and proceeds to 2208. If a neutral voltage is present, monitor/control circuit 204 sets the neutral flag to 1 at 2206 and proceeds to 2208.

At 2208, monitor/control circuit 204 checks whether L1-L2 voltage is greater than 120 V. If not, monitor/control circuit determines that the power being provided to power entry module 104 is 1 pole, 3 wire service and at 2210, sets the power service as 1 pole, 3 wire (NEMA L5-30P). That is, the power being provided to power entry module 104 has a hot line, neutral line and a ground line.

If the L1-L2 voltage is greater than 120 V, monitor/control circuit 204 proceeds to 2212 where it checks if L3-L1 voltage is greater than 120 V. If not, monitor/control circuit determines that the power being provided to power entry module 104 is two pole, 3 wire service and at 2214, sets the power service to 2 pole, 3 wire (NEMA L6-30P). That is, the power being provided to power entry module 104 has two hot lines (L1, L2) and a ground line.

At 2216 monitor/control circuit 204 checks whether the neutral flag had been set to 0 (neutral voltage not present) or 1 (neutral voltage present). If the neutral flag was set to zero, monitor/control circuit 204 determines that the power being provided to power entry module 104 is 3 pole, 4 wire service and at 2218, sets the power service to 3 pole, 4 wire (NEMA L15-30P). That is, the power being provided to power entry module 104 has three hot lines and a ground line.

If the neutral flag had been set to 1, monitor/control circuit 204 determines that the power being provided to power entry module 104 is 3 pole, 5 wire service and at 2220, set the power service to 3 pole, 5 wire (NEMA L21-30P). That is, the power being provided to power entry module 104 has three hot lines, a neutral line and a ground line.

The power service set for power entry module 104 is used by monitor/control circuit 204 of power entry module 104 in determining the monitoring that it does. For example, monitor/control circuit 204 uses the power service set for power entry module 104 to determine what calculations to use in determining the power being drawn by power rail 102 through power entry module 104. For example, if the power service is 1 pole, 3 wire, calculations for this type of power service are used in determining the power being drawn. If the power service is 3-pole, 5-wire, calculations for this type of power service are used in determining the power being drawn. Monitor/control circuit 412 may also use the power service set for power entry module 104 to determine default alarm thresholds.

Figure 23:
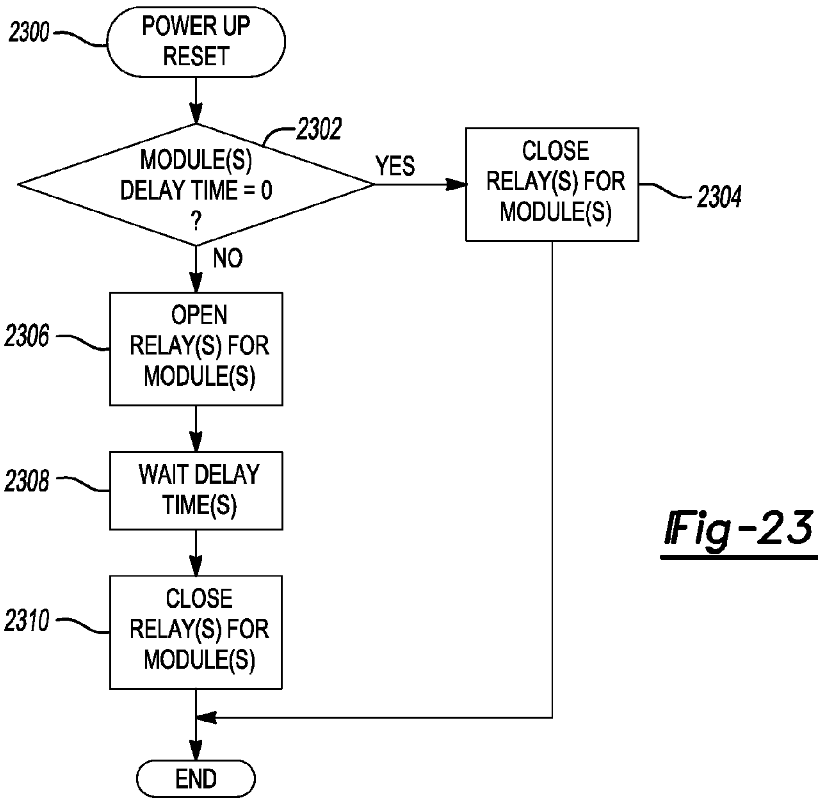
FIG. 23 is a flow chart of a power-up sequence of the receptacle modules of FIG. 4 mounted on the adaptive power strip of FIG. 1 in accordance with an aspect of the present disclosure.

In an aspect, where receptacle module 106 includes the capability for managing individual receptacles 400, monitor/control circuit 412 implements a power up sequence of the individual receptacles 400. Illustratively, monitor/control circuit 412 is programmed with an appropriate software program to implement this sequence, as described with reference to the flow chart of FIG. 23. The power up sequence starts upon a power up restart at 2300. Illustratively, a power-up restart occurs when circuit breaker 402 has been open for a preset period of time, such as five seconds by way of example and not of limitation, and is then closed. In this regard, upon circuit breaker being open the preset period of time, monitor/control circuit 412 opens relays 410 for each of receptacles 400 disconnecting them from at least a hot line of power lines 432 so that they will be disconnected from power when circuit breaker 402 is being closed. At 2302, monitor/control circuit 412 checks whether the delay time for each plug receptacle 400 has been set to zero. In this regard, the factory default setting for the power-up delay time for each plug receptacle 400 is zero. The power-up delay time for each plug receptacle 400 is remotely programmable by a user, such as by commands sent from a host system to receptacle module 106 via communications module 209 of power entry module 104. By way of example and not of limitation, the power-up delay time for each plug receptacle 400 can be set from 0 to 7200 seconds in one second increments. For each plug receptacle 400 where the power up delay time has been set to zero, monitor/control circuit 412 closes at 2304 the relay 410 (FIG. 5) for that plug receptacle 400 connecting that plug receptacle 400 to power lines 432 and thus to power. For each plug receptacle 400 where the power-up delay time has been set to non-zero, the monitor/control circuit at 2306 opens the relay 410 for that plug receptacle 400 disconnecting that plug receptacle 400 from at least the hot line(s) of power lines 432 and thus from power, at 2308 waits the power-up delay time that has been set for that plug receptacle 400 and at 2310, and at 2310 closes the relay 410 for that plug receptacle 400 connecting power to that plug receptacle 400.

Figure 16:
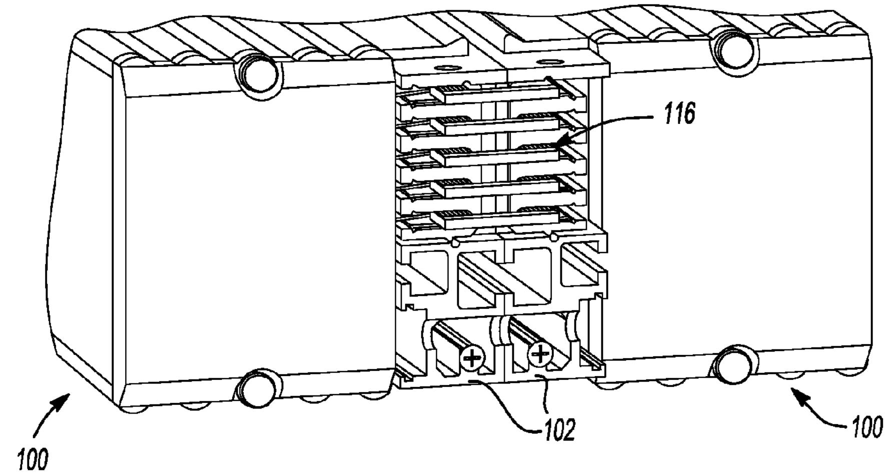
FIG. 16 is a perspective end view of two adaptive power strips of FIG. 1 coupled together.

FIG. 16 shows a plurality of power rails 102 mounted side by side where the rails of the power rails 102 are interconnected, such as by a bridging connector 1600. It should be understood that power rails 102 can also be mounted end to end and interconnected. Also, power rails 102 can be spaced from each other and interconnected with a cord.

Figure 17:
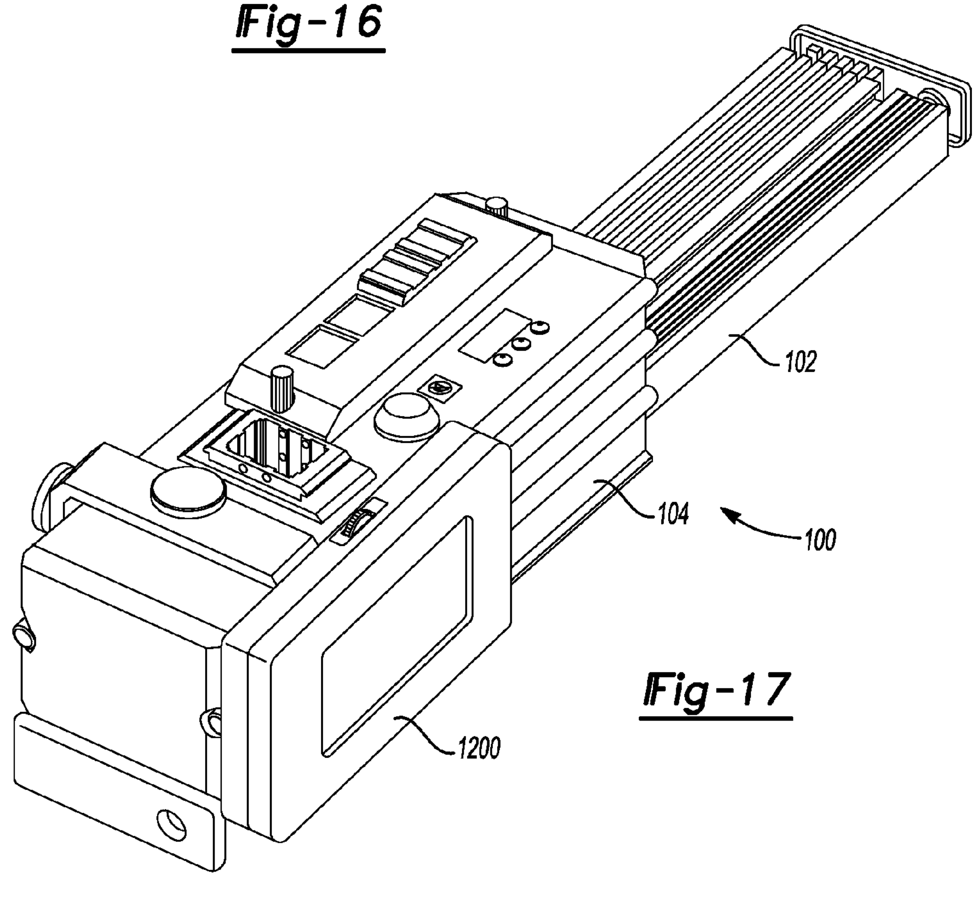
FIG. 17 is a perspective side view of the adaptive power strip of FIG. 1 having a power entry module of FIG. 2 mounted thereon with the display module of FIG. 12 mounted to the power entry module.

FIG. 17 shows an adaptive power strip 100 having a power entry module 104 mounted on a power rail 102 and a display module 1200 mounted to power entry module 104.

Figure 18:
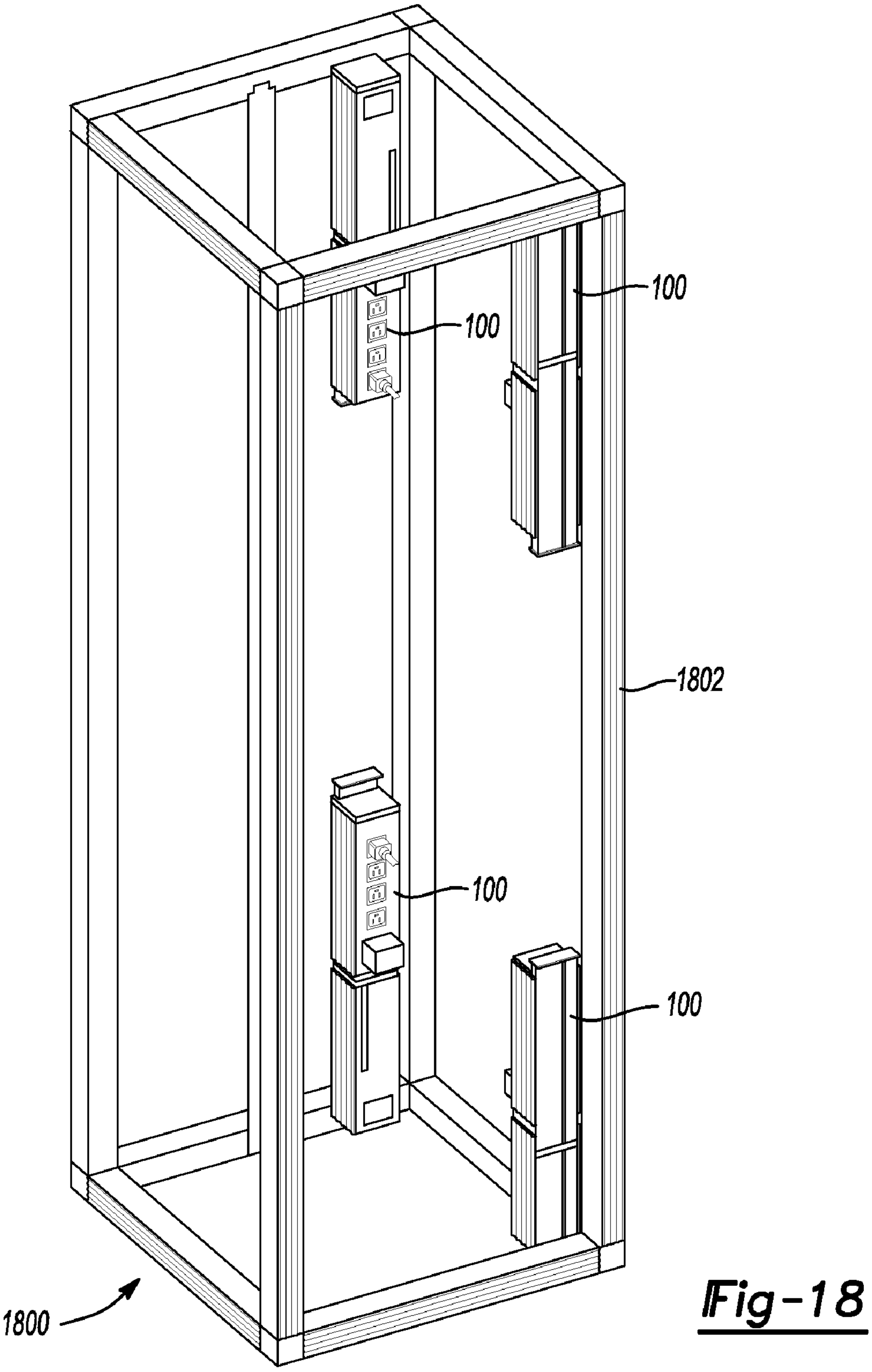
FIG. 18 is a side perspective view of an equipment rack having a plurality of adaptive power strips of FIG. 1.

FIG. 18 shows a rack 1800 having a plurality of adaptive power strips 100 mounted therein. In an illustrative aspect shown in FIG. 18, the adaptive power strips 100 are mounted at a back 1802 of rack 1800 and oriented so that the adaptive power strips 100 on opposite sides of the rack face each other. The adaptive power strips could also be oriented so that they face the front of the rack or the back of the rack.

Figure 19A:
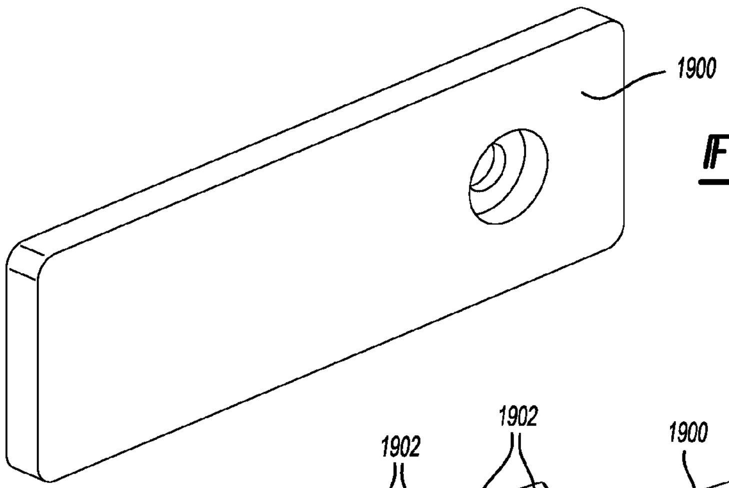
FIG. 19A and 19B are front and rear perspective views of an end cap for the power rail of FIG. 6.
Figure 19B:
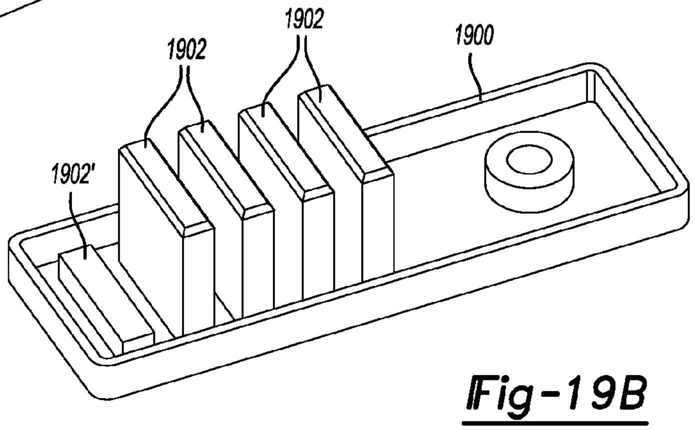

FIGS. 19A and 19B show an end cap 1900 for a power rail 102. Illustratively, end cap 1900 is a molded plastic piece having blades 1902 that fit into the slots of the power rail 102. The blade 1902 that fits into the slots of the power rail 102 carrying the ground rail, identified as blade 1902', may include a conductor that connects the ground to the chassis of the power rail 102.

The flexibility of the above described adaptive power strips allow them to be positioned in racks in a more flexible manner to better utilize space available in the rack. It also allows full advantage to be taken of the power capacity and the ability to maximize power deliver, such as by adding receptacles by adding receptacle modules.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on”, “engaged to”, “connected to” or “coupled to” another element or layer, it may be directly on, engaged, connected or coupled to the other element or layer, or intervening elements or layers may be present. In contrast, when an element is referred to as being “directly on,” “directly engaged to”, “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath”, “below”, “lower”, “above”, “upper” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

What is claimed is:

1. A receptacle module for mounting on a power rail of a power strip, comprising a housing removably mountable on the power rail, the housing including a plurality of receptacle module AC power terminals that removably mate with AC power bus conductors of the power rail and a plurality of receptacle module communications bus terminals, the receptacle module communications bus terminals having data and DC power terminals that removably mate with data and DC power conductors of a communications bus of the power rail;

a plurality of plug receptacles for insertion of plugs of cords, the receptacle module distributing AC power from the power rail to the receptacle module’s plug receptacles; and a receptacle module DC power supply coupled to the receptacle module AC power terminals that provides DC power from AC power provided by the AC power bus conductors of the power rail, the DC power supply having an output coupled to the receptacle module communications bus DC power terminal to provide DC power to the DC power conductor of the communications bus of the power rail.

2. The apparatus of claim 1 wherein the receptacle module distributes AC power to its plug receptacles through relays.

3. The apparatus of claim 1 wherein the receptacle module distributes one of single phase AC power or polyphase AC power to its plug receptacles.

4. The apparatus of claim 1 wherein the housing includes a contact block, the contact block including the AC power terminals, the AC power terminals comprising a plurality of blades that mate with respective slots in the power rail in which the AC power bus conductors of the power rail run, each blade including a shroud between which a contact that mates with one of the AC power conductors of the power rail is disposed, each AC power terminal having a lower portion having at least one pair of spring contacts.

5. The apparatus of claim 4 wherein the receptacle module has a power configuration and the contact block includes only blades for connecting to those of the AC power conductors of the power rails needed for the power configuration.

* * * * *